United States Patent
Narahara

(10) Patent No.: US 11,084,963 B2
(45) Date of Patent: Aug. 10, 2021

(54) COLD STORAGE MATERIAL COMPOSITION, METHOD FOR USING COLD STORAGE MATERIAL COMPOSITION, COLD STORAGE MATERIAL, AND TRANSPORT CONTAINER

(71) Applicant: KANEKA CORPORATION, Osaka (JP)

(72) Inventor: Risa Narahara, Osaka (JP)

(73) Assignee: KANEKA CORPORATION, Osaka (JP)

( * ) Notice: Subject to any disclaimer, the term of this patent is extended or adjusted under 35 U.S.C. 154(b) by 0 days.

(21) Appl. No.: 16/498,305

(22) PCT Filed: Mar. 14, 2018

(86) PCT No.: PCT/JP2018/010066
§ 371 (c)(1),
(2) Date: Sep. 26, 2019

(87) PCT Pub. No.: WO2018/180506
PCT Pub. Date: Oct. 4, 2018

(65) Prior Publication Data
US 2020/0385623 A1 Dec. 10, 2020

(30) Foreign Application Priority Data

Mar. 29, 2017 (JP) .............................. JP2017-065192
Sep. 27, 2017 (JP) .............................. JP2017-186204
Oct. 27, 2017 (JP) .............................. JP2017-208053

(51) Int. Cl.
*C09K 5/06* (2006.01)
*F28D 20/02* (2006.01)

(52) U.S. Cl.
CPC ................ *C09K 5/06* (2013.01); *C09K 5/063* (2013.01); *F28D 20/021* (2013.01)

(58) Field of Classification Search
CPC .......... C09K 5/06; C09K 5/063; C09K 5/066; F28D 20/021
(Continued)

(56) References Cited
U.S. PATENT DOCUMENTS 4,397,752 A     8/1983 Kimura et al.
4,715,978 A * 12/1987 Yano ..................... F28D 20/023
                                                                                252/70
(Continued)

FOREIGN PATENT DOCUMENTS

CN       102732227 A     10/2012
CN       102746829 A     10/2012
(Continued)

OTHER PUBLICATIONS

CN 104726071 A, Derwent Abstracts, published Jun. 24, 2015, to Gao et al. (Year: 2015).*
(Continued)

*Primary Examiner* — Jane L Stanley
(74) *Attorney, Agent, or Firm* — Osha Bergman Watanabe & Burton LLP

(57) ABSTRACT

It is an object of the present invention to provide a novel cold storage material composition allowing for temperature maintenance of a temperature control target article in various controlled temperature ranges in a range of −75° C. to −30° C., a method of using the cold storage material composition, a cold storage material including the cold storage material composition, and a transport container including the cold storage material. Provided is a cold storage material composition including a multicomponent eutectic which is composed of water and two or more kinds of compounds and having a melting temperature in a range of −75° C. to −30° C.

9 Claims, 4 Drawing Sheets

(58) Field of Classification Search
USPC .......................................................... 252/71
See application file for complete search history.

(56) References Cited

U.S. PATENT DOCUMENTS

| | | | |
|---|---|---|---|
| 5,348,080 | A | 9/1994 | Kuroda et al. |
| 5,860,282 | A * | 1/1999 | Liberman ............. F25D 13/065 62/63 |
| 6,086,782 | A * | 7/2000 | Hsu .......................... C09K 5/10 252/570 |
| 6,469,085 | B1 | 10/2002 | Mizutani |
| 7,967,999 | B2 * | 6/2011 | Tomura .................. C09K 5/063 252/70 |
| 9,096,787 | B2 | 8/2015 | Rowley et al. |
| 9,845,420 | B2 | 12/2017 | Machida et al. |
| 10,717,910 | B2 * | 7/2020 | Katano ..................... C09K 5/06 |
| 2005/0133757 | A1 * | 6/2005 | Umemoto .............. C09K 5/066 252/70 |
| 2014/0318158 | A1 * | 10/2014 | Shuntich ................ C09K 5/066 62/64 |
| 2018/0105728 | A1 * | 4/2018 | Katano .................. C09K 5/066 |
| 2020/0248057 | A1 * | 8/2020 | Sezukuri .................. C09K 5/06 |
| 2020/0399516 | A1 * | 12/2020 | Narahara ............... C09K 5/066 |

FOREIGN PATENT DOCUMENTS

| | | | | |
|---|---|---|---|---|
| CN | 106566480 | A | 4/2017 | |
| JP | S57-153077 | A | 9/1982 | |
| JP | S62-30182 | A | 2/1987 | |
| JP | H02-238277 | A | 9/1990 | |
| JP | H03-281593 | A | 12/1991 | |
| JP | H05-39988 | A | 2/1993 | |
| JP | H06-50686 | A | 2/1994 | |
| JP | H06-158362 | A | 6/1994 | |
| JP | 07026250 | A * | 1/1995 | .............. C09K 5/06 |
| JP | H07-26250 | A | 1/1995 | |
| JP | H11035933 | A | 2/1999 | |
| JP | H11-349936 | A | 12/1999 | |
| JP | H11335660 | A | 12/1999 | |
| JP | 2000-144123 | A | 5/2000 | |
| JP | 2000-351963 | A | 12/2000 | |
| JP | 2002-071248 | A | 3/2002 | |
| JP | 2002-139272 | A | 5/2002 | |
| JP | 2002-265936 | A | 9/2002 | |
| JP | 2002-371269 | A | 12/2002 | |
| JP | 2003-041242 | A | 2/2003 | |
| JP | 2003-171657 | A | 6/2003 | |
| JP | 2004-307772 | A | 11/2004 | |
| JP | 2006-335940 | A | 12/2006 | |
| JP | 2008-134005 | A | 6/2008 | |
| JP | 2011-196580 | A | 10/2011 | |
| JP | 2014-070141 | A | 4/2014 | |
| JP | 2015-067651 | A | 4/2015 | |
| JP | 2017-128622 | A | 7/2017 | |
| WO | 2014091938 | A1 | 6/2014 | |
| WO | 2016/204284 | A1 | 12/2016 | |

OTHER PUBLICATIONS

CN 102746829 A, Derwent Abstracts, published Oct. 24, 2012, to Cheng et al. (Year: 2012).*
EPO Machin translation of CN 102746829 A, published Oct. 24, 2012, to Cheng et al. (Year: 2012).*
International Search Report issued in International Application No. PCT/JP2018/010066, dated May 1, 2018 (2 pages).
Written Opinion issued in International Application No. PCT/JP2018/010066, dated May 1, 2018 (4 pages).
Office Action issued in corresponding Chinese Application No. 201880021699.6, dated Feb. 3, 2020 (21 pages).
International Preliminary Report on Patentability issued in International Application No. PCT/JP2018/010066, dated Dec. 14, 2018 (7 pages).
International Search Report issued in International Application No. PCT/JP2019/008232, dated May 14, 2019 (2 pages).
Written Opinion issued in International Application No. PCT/JP2019/008232, dated May 14, 2019 (22 pages).
Extended European Search Report issued in corresponding European Application No. 18775582.2; dated Nov. 27, 2020 (8 pages).
S.A. Ketcham et al., "Manual of Practice for an Effective Anti-Icing Program A Guide For Highway Winter Maintenance Personnel Prepared for the Federal Highway Administration by US Army cold Regions," Feb. 22, 1996 (72 pages).
Office Action issued in corresponding European Application No. 16811758.8; dated Jun. 23, 2020 (8 pages).
International Search Report issued in corresponding International Application No. PCT/JP2016/068152; dated Jul. 19, 2016 (2 pages).
International Preliminary Report on Patentability issued in corresponding International Application No. PCT/JP2016/068152; dated Dec. 28, 2017 (8 pages).
Office Action issued in U.S. Pat. No. 10,717,910; dated Nov. 19, 2019 (8 pages).
Office Action issued in corresponding Chinese Patent Application No. 201980017169.9, dated Apr. 16, 2021 (16 pages).

* cited by examiner

COLD STORAGE MATERIAL COMPOSITION, METHOD FOR USING COLD STORAGE MATERIAL COMPOSITION, COLD STORAGE MATERIAL, AND TRANSPORT CONTAINER

TECHNICAL FIELD

The present invention relates to (i) a cold storage material composition for controlling a temperature of an article, (ii) a method of using the cold storage material composition, (iii) a cold storage material including the cold storage material composition, and (iv) a transport container including the cold storage material.

BACKGROUND ART

Various heat storage material compositions or cold storage material compositions using latent heat have conventionally been known (see, for example, Patent Literature 1 and Patent Literatures 5 to 7) and have been used in a variety of fields including a heating and cooling system and storage and transportation of articles.

For example, some of pharmaceutical products, specimens, and the like used in medical facilities such as hospitals and the like and some of foods and the like available in supermarkets and the like need to be kept at a constant temperature in a given temperature range for a given period of time during transportation or storage so that their qualities are maintained.

Examples of a method of transporting or storing articles such as pharmaceutical products, medical devices, cells, specimens, organs, chemical substances, foods, and the like in a state in which the articles are kept at a constant temperature conventionally include the following method: That is, a method in which (i) a cold storage material, which has been frozen and solidified in advance, is placed in a container having a thermal insulation property to prepare a temperature keeping container and (ii) an article housed in the temperature keeping container is transported or stored in a state in which the temperature of the article is maintained by using latent heat of melting of the cold storage material. To maintain the above-described article to be kept at a constant temperature (hereinafter also referred to as "temperature control target article") in a given temperature (hereinafter also referred to as "controlled temperature") range for a long period of time, a cold storage material having a melting temperature in the given temperature range is preferably used.

Some of the temperature control target articles need to be transported at controlled temperatures of −30° C. or lower, preferably −50° C. or lower, more preferably −70° C. or lower, and other temperature. To meet these controlled temperatures, dry ice has conventionally been used as a cold storage material. Dry ice is inexpensive and versatile. However, dry ice has the problem of, for example, being treated as a hazardous material in a case of transportation, air transportation in particular, and being limited in the amount loaded when used as a cold storage material for use in a temperature keeping container (transport container). This is because dry ice expands in volume when sublimating (phase transition from a solid to a gas).

As a cold storage material that can be used in a low temperature range and does not involve phase transition to a gas, a cold storage material composition using an aqueous inorganic salt solution containing water and a specific inorganic salt has been disclosed.

For example, Patent Literature 2 discloses a cold storage material composition having a melting temperature of −47.5° C. This cold storage material composition is obtained by mixing 15% by weight (after mixing, 1.3 mol %) of calcium chloride and 5% by weight (after mixing, 0.5 mol %) of magnesium chloride into water.

Further, Patent Literature 3 discloses a cold storage material composition containing 6 mol of calcium chloride (5.6 mol % relative to the total molar quantity of the cold storage material composition) and 2 mol of sodium chloride (1.9 mol % relative to the total molar quantity of the cold storage material composition) relative to 100 mol of water, and containing, as a thickener, 1% by weight of high viscosity-type hydroxyethyl cellulose relative to the total weight of the cold storage material composition, the cold storage material composition having a melting temperature of −54.7° C.

Further, Patent Literature 4 discloses a cold storage material in a slurry which is obtained in such a manner that an aqueous solution in which inorganic salt is dissolved in a concentration equal to or below a solute concentration at an eutectic point is cooled to a temperature which is lower than a freezing start temperature and is higher than the eutectic point so that an ice is partially precipitated out of the aqueous solution, the cold storage material having fluidity and undergoing a phase change (melting) in a freezing temperature range (−18° C. or lower).

CITATION LIST

Patent Literature

[Patent Literature 1]
Japanese Patent Application Publication Tokukai No. 2004-307772
[Patent Literature 2]
Japanese Patent Application Publication Tokukai No. 2002-371269
[Patent Literature 3]
International publication No. WO2016/204284
[Patent Literature 4]
Japanese Patent Application Publication Tokukaihei No. 7-26250
[Patent Literature 5]
Japanese Patent Application Publication Tokukaihei No. 6-158362
[Patent Literature 6]
Japanese Patent Application Publication Tokukai No. 2011-196580
[Patent Literature 7]
Japanese Patent Application Publication, Tokukaishou, No. 62-30182

SUMMARY OF INVENTION

Technical Problem

Unfortunately, the above-described cold storage material composition known in the art still has room for improvement.

The present invention has been attained in view of the above problem, and an object of the present invention is to provide a cold storage material composition allowing for temperature maintenance of a temperature control target article in various controlled temperature ranges in a range of −75° C. to −30° C., a method of using the cold storage material composition, a cold storage material including the cold storage material composition, and a transport container including the cold storage material.

Solution to Problem

The inventor of the present invention made diligent studies in order to attain the above object, and as a result thereof accomplished the present invention by making the following novel finding: a cold storage material composition having a melting temperature in a range of −75° C. to −30° C. is obtained by using a multicomponent eutectic composed of water and two or more kinds of specific compounds.

Further, the inventor of the present invention made diligent studies in order to attain the above object, and as a result thereof accomplished the present invention by making the following novel finding: a cold storage material composition having a melting temperature in a range of −75° C. to −30° C. is obtained by containing water, calcium ions, chloride ions, and bromide ions in respectively specific amounts.

That is, an embodiment of the present invention is directed to a cold storage material composition including a multicomponent eutectic which is composed of water and two or more kinds of compounds, the cold storage material composition having a melting temperature in a range of −75° C. to −30° C.

Further, another embodiment of the present invention is directed to a cold storage material composition including 0.1 mol to 18 mol of calcium ions, 0.1 mol to 19 mol of chloride ions, and 0.1 mol to 20 mol of bromide ions, relative to 100 mol of water, the cold storage material composition having a melting temperature in a range of −75° C. to −30° C.

Still further, still another embodiment of the present invention is directed to a method of using a cold storage material composition, including: a solidifying step of keeping a cold storage material composition at a temperature lower than a melting temperature of the cold storage material composition to solidify the cold storage material composition, the cold storage material composition including a multicomponent eutectic which is composed of water and two or more kinds of compounds; and a maintaining step of maintaining part or whole of a target object at not less than −75° C. to not more than −30° C. under an environment with a temperature which exceeds the melting temperature of the cold storage material composition.

Yet further, further another embodiment of the present invention is directed to a method of using a cold storage material composition, including: a solidifying step of keeping a cold storage material composition at a temperature lower than a melting temperature of the cold storage material composition to solidify the cold storage material composition, the cold storage material composition including water, calcium ions, chloride ions, and bromide ions; and a maintaining step of maintaining part or whole of a target object at not less than −75° C. to not more than −30° C. under an environment with a temperature which exceeds the melting temperature of the cold storage material composition, the cold storage material composition including 0.1 mol to 18 mol of the calcium ions, 0.1 mol to 19 mol of the chloride ions, and 0.1 mol to 20 mol of the bromide ions, relative to 100 mol of the water.

Advantageous Effects of Invention

According to an embodiment of the present invention, it is possible to provide a cold storage material composition allowing for temperature maintenance of a temperature control target article in various controlled temperature ranges in a range of −75° C. to −30° C., a method of using the cold storage material composition, a cold storage material including the cold storage material composition, and a transport container including the cold storage material.

Figure 2:
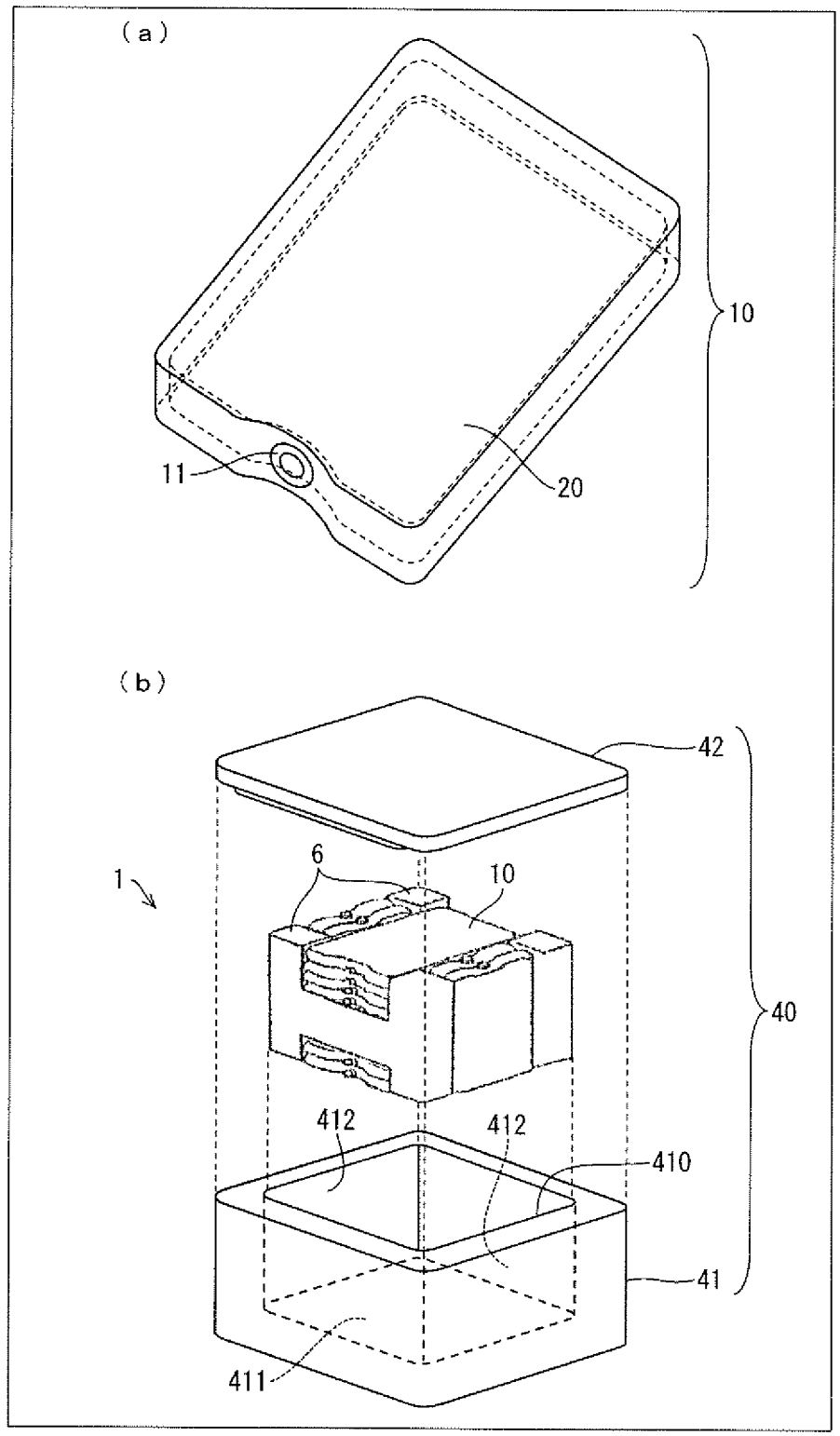

(a) of FIG. 2 is a perspective view schematically illustrating an example of a cold storage material in accordance with an embodiment of the present invention. (b) of FIG. 2 is an exploded perspective view schematically illustrating an example of a transport container in accordance with an embodiment of the present invention.

Figure 3:
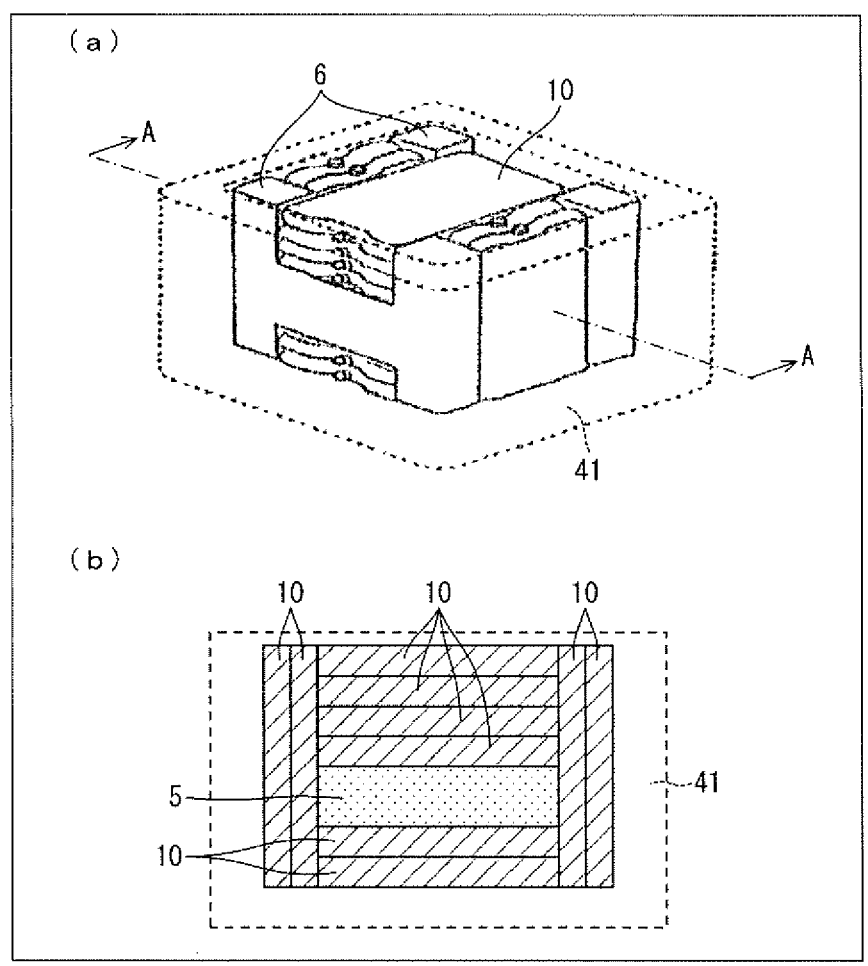

(a) of FIG. 3 is a perspective view schematically illustrating an inside of the transport container, and (b) of FIG. 3 is a cross-sectional view schematically illustrating a plane taken along the line A-A in (a) of FIG. 3.

Figure 4:
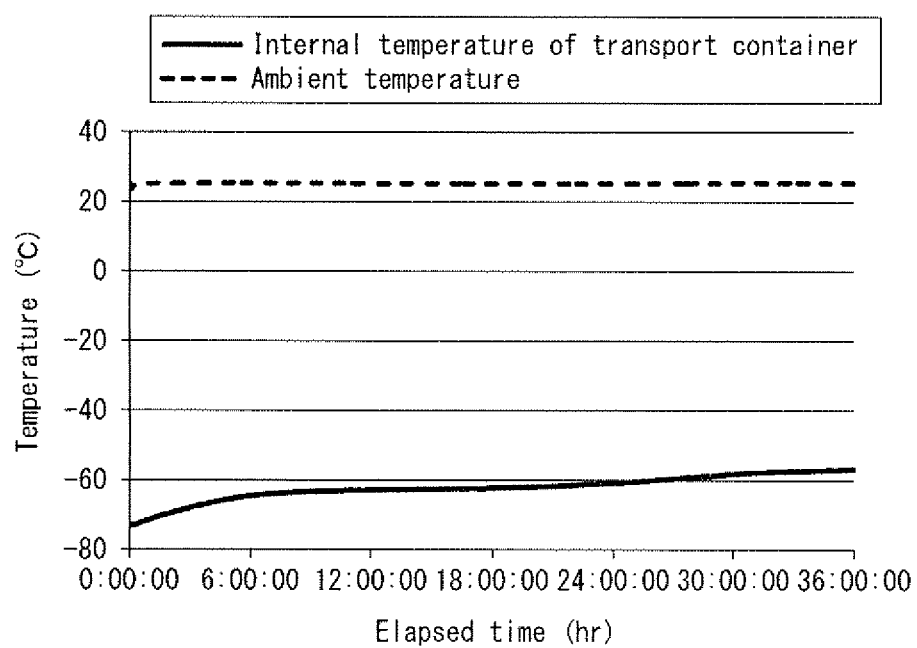

FIG. 4 is a graph schematically illustrating how the temperature in the transport container 1 illustrated in FIG. 2 in accordance with an embodiment of the present invention changed over time in a case where the transport container 1 was left in an environment at a temperature of 25° C. Such a change in temperature over time of the transport container 1 is a change during a process in which the cold storage material composition was melting from the solid state into the liquid state in a case where cold storage materials 10 filled with the cold storage material composition were placed in the transport container 1.

DESCRIPTION OF EMBODIMENTS

The following description will discuss embodiments of the present invention. The present invention is, however, not limited to such embodiments. The present invention is not limited to any configurations described below, and can be altered in various ways within the scope of the claims. The technical scope of the present invention also encompasses embodiments and examples derived from a proper combination of technical means disclosed in different embodiments and examples. All academic and patent documents cited in the present specification are incorporated herein by reference. Further, any numerical range expressed as "A to B" herein means "not less than A (A or more) and not more than B (B or less)" unless otherwise specified.

[1. Cold Storage Material Composition]

A cold storage material composition in accordance with an embodiment of the present invention includes a multicomponent eutectic which is composed of water and two or more kinds of compounds, the cold storage material composition having a melting temperature in a range of −75° C. to −30° C. With the above configuration, the cold storage material composition in accordance with an embodiment of the present invention has the following advantages (1) to (3):

Advantage (1): Since the melting temperature of the cold storage material composition can be adjusted to −75° C. to −30° C. with good repeatability and stability, the cold storage material composition allows for (i) temperature maintenance of a temperature control target article in various controlled temperature ranges in a range of −75° C. to −30° C. and (ii) storage or transportation of the temperature control target article in the various controlled temperature ranges in the range of −75° C. to −30° C.

Advantage (2): The cold storage material composition can be used as a substitute for dry ice.

Advantage (3): The cold storage material composition undergoes low volume expansion while being frozen.

A cold storage material composition in accordance with an embodiment of the present invention is usable as a cold storage material of a latent heat type since the cold storage material composition absorbs thermal energy in undergoing a phase transition from a solidified (solid) state to a molten (liquid) state (in other words, in melting). A cold storage material composition in accordance with an embodiment of the present invention can also be regarded as a melt-type latent heat cold storage material composition.

In the present specification, "a cold storage material composition in accordance with an embodiment of the present invention" can also be referred to simply as "the cold storage material composition". That is, the term "the cold storage material composition" is intended to mean an embodiment of the cold storage material composition in accordance with the present invention.

The following description will first discuss components of the cold storage material composition, and will then discuss physical properties (e.g., a melting temperature) of the cold storage material composition and a method of producing the cold storage material composition.

[1-1. Components of Cold Storage Material Composition]

The cold storage material composition need only contain a multicomponent eutectic composed of water and two or more kinds of compounds, and other configurations of the cold storage material composition are not limited to any particular ones. The cold storage material composition containing the multicomponent eutectic can have a melting temperature in a range of −75° C. to −30° C. Thus, the cold storage material composition allows for temperature maintenance of a temperature control target article in various controlled temperature ranges in a range of −75° C. to −30° C.

The multicomponent eutectic contained in the cold storage material composition is composed of water and two or more kinds of compounds. The "multicomponent" is preferably "three-or-more component (e.g., three-component, four-component, five-component, etc.)". With the compounds selected appropriately, the cold storage material composition has an advantage in that the cold storage material composition allows for (i) temperature maintenance of a temperature control target article in various controlled temperature ranges in a range of −75° C. to −30° C. and (ii) storage or transportation of the temperature control target article in the various controlled temperature ranges in the range of −75° C. to −30° C. Above all, the multicomponent eutectic is preferably a three-component eutectic.

In the present specification, a cold storage material composition contains water and two or more kinds of compounds, and more specifically, a cold storage material composition containing (i) water and (ii) a compound C1, . . . , and a compound Cn (wherein n is an integer of 2 or more) and satisfying both of conditions (1) and (2) below is defined as "a cold storage material composition containing a multicomponent eutectic (more specifically, (n+1)-component eutectic)".

Condition (1): A cold storage material composition has a melting temperature which is lower than all of eutectic point-derived melting temperatures (in other words, melting temperatures of two-component systems) exhibited by individual combinations of water and any one of the compounds (specifically, a combination of water and the compound C1, . . . , and a combination of water and the compound Cn)).

Condition (2): All of the compounds from the compound C1 to the compound Cn have molar quantities in such a range that the melting temperature of the cold storage material composition is kept constant even when a ratio of concentration between the compounds in the cold storage material composition (specifically, a molar ratio between the compounds in the cold storage material composition) and/or the molar quantity of the compounds is/are changed by a predetermined amount. Note that the "molar quantity of the compounds" as used herein refers to the amount of substance (mol) of any components contained in the cold storage material composition when the amount of substance (mol) of water contained in the cold storage material composition is 100.

In the present specification, the conditions (1) and (2) are more specifically defined as below. In regard to the condition (1), in a case where a cold storage material composition has a melting temperature which is 1° C. or more lower than all of eutectic point-derived melting temperatures exhibited by individual combinations, i.e., a combination of water and the compound C1, . . . , and a combination of water and the compound Cn, the cold storage material composition is defined as a cold storage material composition satisfying the condition (1). In regard to the condition (2), in a case where all of the compounds from the compound C1 to the compound Cn have molar quantities in such a range that the amount by which the melting temperature of the cold storage material composition changes even with a 0.5 mol change in molar quantity (mol relative to 100 mol of water) of at least one of the compounds in the cold storage material composition falls within 1.0° C., the cold storage material composition is defined as a cold storage material composition satisfying the condition (2).

In an embodiment of the present invention, the two or more kinds of compounds included together with water in the multicomponent eutectic are not particularly limited as long as the conditions (1) and (2) are satisfied, and the two or more kinds of compounds can be, for example, organic substances or inorganic salts. A combination of the two or more kinds of compounds is not particularly limited. The combination of the two or more kinds of compounds may be any combination of compounds, and may be a combination of organic substances, a combination of inorganic salts, or a combination of any of the organic substances and any of the inorganic salts.

The organic substances are, for example, alcohols, and polysaccharides.

The two or more kinds of compounds are more preferably inorganic salts, from the viewpoint of exhibiting the fixed-temperature maintaining performance with higher stability and higher repeatability and undergoing low volume expansion. Examples of the inorganic salts include chloride salts, bromide salts, sulfates, nitrates, formates, hydroxide salts, iodide salts, ammonium salts, and metal salts such as calcium salts. Among the inorganic salts listed above, calcium salts, chloride salts, and bromide salts are preferable, from the viewpoint of exhibiting the fixed-temperature maintaining performance with higher stability and higher repeatability and undergoing low volume expansion. The two or more kinds of compounds may be selected from a single type of salts among the inorganic salts listed above or may be a combination of two or more types of salts among the inorganic salts listed above.

In the cold storage material composition in accordance with an embodiment of the present invention, the two or more kinds of compounds are preferably inorganic salts, and the inorganic salts preferably include (i) a calcium salt(s) and/or (ii) a chloride salt (A) and a bromide salt (B). With the above constituents, the cold storage material composition has the advantage of exhibiting the fixed-temperature maintaining performance with higher stability and higher repeatability and the advantage of undergoing low volume expansion. In the cold storage material composition in accordance with an embodiment of the present invention, the two or more kinds of compounds may include not only (i) a calcium salt(s) and/or (ii) a chloride salt (A) and a bromide salt (B), but also an organic substance and/or an inorganic salt.

Examples of the calcium salt(s) include calcium fluoride, calcium chloride, calcium bromide, calcium iodide, calcium oxide, calcium sulfide, calcium nitride, calcium phosphide, calcium carbide, and calcium boride. These calcium salts can be used individually or in combination. In the cold storage material composition, the calcium salt(s) is preferably at least one calcium salt selected from the group consisting of calcium chloride and calcium bromide, from the viewpoint of exhibiting the fixed-temperature maintaining performance with higher stability and higher repeatability, undergoing low volume expansion, and offering easier handling of the compounds.

Examples of the chloride salt (A) include sodium chloride, calcium chloride, ammonium chloride, lithium chloride, potassium chloride, magnesium chloride, zinc chloride, and aluminum chloride. These example chloride salts (A) can be used individually or in combination. In the cold storage material composition, the chloride salt (A) is preferably calcium chloride, from the viewpoint of exhibiting the fixed-temperature maintaining performance with higher stability and higher repeatability and undergoing low volume expansion. Also, the chloride salt (A) is preferably calcium chloride, which is inexpensive and easy to handle. Calcium chloride can be commonly used as a snow melting agent.

In an embodiment of the present invention, examples of the bromide salt (B) include ammonium bromide, potassium bromide, sodium bromide, calcium bromide, lithium bromide, magnesium bromide, and zinc bromide. These example bromide salts (B) can be used individually or in combination. The bromide salt (B) is preferably at least one bromide salt selected from the group consisting of ammonium bromide, potassium bromide, sodium bromide, and calcium bromide, from the viewpoint of exhibiting the fixed-temperature maintaining performance with higher stability and higher repeatability and undergoing low volume expansion. Above all, the bromide salt (B) is more preferably at least one bromide salt selected from the group consisting of ammonium bromide and calcium bromide, from the viewpoint of more reliably exhibiting the fixed-temperature maintaining performance. The bromide salt (B) is even more preferably calcium bromide, which is safe enough to be used as a raw material for pharmaceutical products and is easy to handle.

The following will consider a case where a cold storage material composition contains the chloride salt (A) and the bromide salt (B) as the two or more kinds of compounds. The amount of the chloride salt (A) contained in the cold storage material composition is not limited to any particular amount. However, the amount of the chloride salt (A) contained in the cold storage material composition is preferably in a range of 0.1 mol to 10 mol, more preferably in a range of 0.5 mol to 10 mol, even more preferably in a range of 1 mol to 10 mol, further more preferably in a range of 1 mol to 7 mol, still further more preferably in a range of 1 mol to 6 mol, and particularly preferably in a range of 3 mol to 5 mol, relative to 100 mol of water contained in the cold storage material composition. With the content of the chloride salt (A) in the above ranges, the cold storage material composition can further obtain the effects described in Advantages (1) to (3) above. The amount of the bromide salt (B) contained in the cold storage material composition is not limited to any particular amount. However, the amount of the bromide salt (B) contained in the cold storage material composition is preferably in a range of 0.1 mol to 10 mol, more preferably in a range of 1 mol to 10 mol, even more preferably in a range of 1 mol to 9 mol, further more preferably in a range of 2 mol to 8 mol, and particularly preferably in a range of 3 mol to 6 mol, relative to 100 mol of water contained in the cold storage material composition. With the content of the bromide salt (B) in the above ranges, the cold storage material composition can further obtain the effects described in Advantages (1) to (3) above.

In a case where the cold storage material composition contains calcium chloride as the chloride salt (A), the molar ratio between water and calcium chloride in the cold storage material composition (water/calcium chloride) is not limited to any particular ratio, but is preferably in a range of 0.1 to 100 in terms of easy handling.

A molar ratio between the chloride salt (A) and the bromide salt (B) (bromide salt (B)/chloride salt (A)) in the cold storage material composition is not limited to any particular molar ratio. However, the molar ratio between the chloride salt (A) and the bromide salt (B) contained in the cold storage material composition is preferably in a range of 0.1 to 10, more preferably in a range of 0.2 to 6.0, even more preferably in a range of 0.3 to 1.4, further more preferably in a range of 0.8 to 1.4, and particularly preferably in a range of 0.9 to 1.1. Further, the molar ratio between the chloride salt (A) and the bromide salt (B) (bromide salt (B)/chloride salt (A)) in the cold storage material composition is preferably in a range of 0.5 to 10, and more preferably in a range of 0.7 to 6.0. With the molar ratio between the chloride salt (A) and the bromide salt (B) in the above ranges, the cold storage material composition can further obtain the effects described in Advantages (1) to (3) above.

The following will consider a case where the cold storage material composition contains calcium chloride as the chloride salt (A) and calcium bromide as the bromide salt (B). In such a case, a molar ratio between calcium chloride and calcium bromide in the cold storage material composition (calcium bromide/calcium chloride) is not limited to any particular ratio, but is preferably in a range of 0.1 to 10 in terms of easy handling.

The following description will discuss a case where a cold storage material composition in accordance with an embodiment of the present invention contains a calcium salt, the chloride salt (A), and the bromide salt (B) as the two or more kinds of compounds. In such a case, any one of the chloride salt (A) and the bromide salt (B) contained in the cold storage material composition may be a calcium salt. Alternatively, the cold storage material composition may contain a calcium salt which, is not included in the chloride salt (A) or the bromide salt (B). That is, specific configurations of a cold storage material composition in accordance with an embodiment of the present invention are, for example, the following configurations (i) to (iii): (i) a configuration in which calcium chloride and the bromide salt (B) are contained as the two or more kinds of compounds; (ii) a configuration in which the chloride salt (A) and calcium bromide are contained as the two or more kinds of compounds; and (iii) a configuration in which the chloride salt (A), the bromide salt (B), and calcium salt are contained.

In an embodiment of the present invention, compounds contained in a cold storage material composition are not limited to any particular compounds. However, the compounds contained in a cold storage material composition are preferably ones that are in no danger of generating harmful fumes and/or do not have the properties of a strong alkali, a strong acid, and the like. The above configuration has an advantage of offering easy production and easy handling of the cold storage material composition. In other words, the phrase "easy handling" as used herein is intended to mean that substances (compounds) contained in a cold storage material composition and the cold storage material composition itself are in no danger of generating harmful fumes and/or do not have the properties of a strong alkali, a strong acid, and the like. For example, Patent Literature 4 describes zinc chloride and potassium hydroxide as inorganic salts having an eutectic point of −60° C. or lower when mixed with water. However, since zinc chloride can generate harmful fumes, and potassium hydroxide is strongly alkaline, it can be said that zinc chloride and potassium hydroxide are difficult-to-handle compounds.

The water in the cold storage material composition may be water usable as drinking water and may be, for example, soft water, hard water, pure water, and the like water.

The cold storage material composition in accordance with an embodiment of the present invention is, as described later, charged into a container, a bag, or the like so as to be formed into a cold storage material. The cold storage material can be used while being placed in a transport container. However, in a case where a container or the like that shapes the cold storage material breaks during transportation or conveyance, the cold storage material composition charged in the container or the like leaks out of the container or the like. In such a case, there is concern about, for example, the possibility of contaminating a temperature control target article and making the temperature control target article unusable.

Therefore, in order to minimize spillage of the cold storage material composition even in the event of breakage of a container or the like charged with the cold storage material composition during transportation or conveyance, the cold storage material composition in accordance with an embodiment of the present invention preferably contains a thickener so that the cold storage material composition is in a solid form (including a gel-like form).

The thickener is not particularly limited. Examples of the thickener include water-absorbing resin (such as starches, acrylates, povals, carboxymethyl celluloses, and the like), gelatin, agar, silica gel, xanthane gum, gum arabic, guar gum, carrageenan, cellulose, konjac, and the like.

The thickener can be an ionic thickener or a nonionic thickener. In a case where the two or more kinds of compounds contained in the cold storage material composition include an inorganic salt, the inorganic salt is considered to form multicomponent eutectics with water or to be dissolved in the state of ions. Thus, it is preferable to select a nonionic thickener that does not affect these ions.

Examples of the nonionic thickener include guar gum, dextrin, polyvinyl pyrrolidone, hydroxyethyl cellulose, and the like.

In a case where the two or more kinds of compounds contained in the cold storage material composition include an inorganic salt, the inorganic salt may be deposited over time due to a change in temperature, depending on the concentration at which the inorganic salt is contained in the cold storage material composition. In a case where the cold storage material composition contains a thickener, the thickener not only allows the cold storage material composition to be in the gel-like form but also allows ions of the dissolved inorganic salt to be effectively dispersed. This makes it possible to retain the inorganic salt in a system of the cold storage material composition.

Among the examples of the thickener, nonionic thickeners that do not affect metallic ions and inorganic ions dissolved in the cold storage material composition are preferable. Among such nonionic thickeners, hydroxyethyl cellulose which is excellent in gel stability and environmental adaptability is particularly preferable.

A cold storage material composition containing the thickener has the following advantages (1) to (3): (1) The thickener allows the cold storage material composition to maintain a large quantity of latent heat of melting without affecting a melting behavior and a solidifying behavior of the cold storage material composition. (2) The cold storage material composition is prevented from separating into a solid phase and a liquid phase even after a heat cycle test is carried out under an environmental temperature at which the cold storage material composition is expected to be used. (3) It is possible to reduce an environmental load and a workload of collecting the cold storage material composition in the event of leakage of the cold storage material composition due to breakage of the container, the bag, or the like.

Although an optimal amount of thickener to be added varies depending on which type of the thickener is to be used, the thickener is ordinarily added in an amount of preferably 0.1 parts by weight to 10 parts by weight and more preferably 0.2 parts by weight to 5 parts by weight, relative to 100 parts by weight of the cold storage material composition (aqueous solution) containing two or more kinds of compounds. This is because, with such amounts, (1) aggregation and deposition of the compounds contained in the cold storage material composition can be prevented, (2) a special pump or the like is unnecessary during delivery of the cold storage material composition, and (3) handleability of the cold storage material composition is good. A hydroxyethyl cellulose content of 0.2 parts by weight to 5 parts by weight allows a cold storage material composition to be in the form of a transparent gel having a low fluidity.

Other than the above-described components, the cold storage material composition can also contain, as necessary, a phase separation inhibitor (e.g., oleic acid, sodium oleate, potassium oleate, potassium metaphosphate, sodium silicate, or potassium isostearate), a perfume, a colorant, an antibacterial agent, a high molecular polymer, other organic compound, other inorganic compound, and/or the like.

A cold storage material composition in accordance with another embodiment of the present invention includes 0.1 mol to 18 mol of calcium ions ($Ca^{2+}$), 0.1 mol to 19 mol of chloride ions ($Cl^-$), and 0.1 mol to 20 mol of bromide ions ($Br^-$), relative to 100 mol of water, the cold storage material composition having a melting temperature in a range of −75° C. to −30° C. With the above configuration, a cold storage material composition in accordance with another embodiment of the present invention has the advantages described in Advantages (1) to (3) above.

The types and amounts of ions contained in the cold storage material composition are intended to mean types and amounts of ions present in the cold storage material composition in a state of having a temperature equal to or higher than a melting temperature and in a liquefied state. The types and amounts of ions contained in the cold storage material composition can be measured, for example, at room temperature (e.g., 30° C.) by ion chromatography. The measurement can be carried out by any publicly-known method. Further, the following will consider a case where a mixing step of forming a mixture containing specific ions that can dissociate at room temperature is carried out by, for example, a method such as a method (1) or (2) below so that a cold storage material composition is produced without removal of the ions. Method (1) of mixing specific compounds which can dissociate at room temperature and water; or method (2) of mixing aqueous solutions containing specific compounds which can dissociate at room temperature. In such a case, the types and amounts of ions contained in a resulting cold storage material composition may be determined through theoretical calculation from the chemical formulae of the specific compounds used in the mixing step and the amounts of the specific compounds added.

Further, the cold storage material composition can contain compounds such as a calcium salt, a chloride salt, and a bromide salt which are not dissociated (not ionized) at 30° C. In a case where the compounds contained in the cold storage material composition are not dissociated at 30° C., the amounts of the compounds contained in the cold storage material composition do not affect the amounts of calcium ions, chloride ions, and bromide ions contained in the cold storage material composition even when the compounds contain a calcium element, a chlorine element, a bromine element, and others.

A cold storage material composition in accordance with another embodiment of the present invention contains calcium ions in an amount of preferably 0.1 mol to 18 mol, chloride ions in an amount of preferably 1 mol to 19 mol, and bromide ions in an amount of preferably 1 mol to 20 mol, relative to 100 mol of water. A cold storage material composition in accordance with another embodiment of the present invention contains calcium ions in an amount of more preferably 1 mol to 15.5 mol, chloride ions in an amount of preferably 2 mol to 17 mol, and bromide ions in an amount of preferably 2 mol to 18 mol, relative to 100 mol of water.

In the cold storage material composition in accordance with another embodiment of the present invention, a molar ratio of calcium ions, chloride ions, and bromide ions (molar quantity of calcium ions:molar quantity of chloride ions: molar quantity of bromide ions) contained in the cold storage material composition is preferably 1:0.1 to 4:0.1 to 8, and more preferably 1:0.5 to 2:0.1 to 5.5.

In a cold storage material composition in accordance with another embodiment of the present invention, an original form(s) of the calcium ions (in other words, what the calcium ions are derived from) is/are not particularly limited, but is/are preferably calcium chloride and/or calcium bromide, in terms of, for example, ease of handling of the compounds, safety, and inexpensiveness. In a case where the original form(s) of the calcium ions is/are calcium chloride and/or calcium bromide, a resulting cold storage material composition has the advantage of exhibiting the fixed-temperature maintaining performance with higher stability and higher repeatability and the advantage of undergoing low volume expansion.

In a cold storage material composition in accordance with another embodiment of the present invention, an original form of the chloride ions is not particularly limited, but is preferably calcium chloride, in terms of, for example, ease of handling of the compounds and inexpensiveness. In a case where the original form of the chloride ions is calcium chloride, a resulting cold storage material composition has the advantage of exhibiting the fixed-temperature maintaining performance with higher stability and higher repeatability and the advantage of undergoing low volume expansion.

In a cold storage material composition in accordance with another embodiment of the present invention, an original form(s) of the bromide ions is/are not particularly limited, but is/are preferably calcium bromide and/or ammonium bromide, in terms of, for example, ease of handling of the compounds and safety. In a case where the original form(s) of the bromide ions is/are calcium bromide and/or ammonium bromide, a resulting cold storage material composition has the advantage of exhibiting the fixed-temperature maintaining performance with higher stability and higher repeatability and the advantage of undergoing low volume expansion.

[1-2. Physical Properties of Cold Storage Material Composition]

A cold storage material composition in accordance with an embodiment of the present invention has a melting temperature in a range of −75° C. to −30° C.

Figure 1:
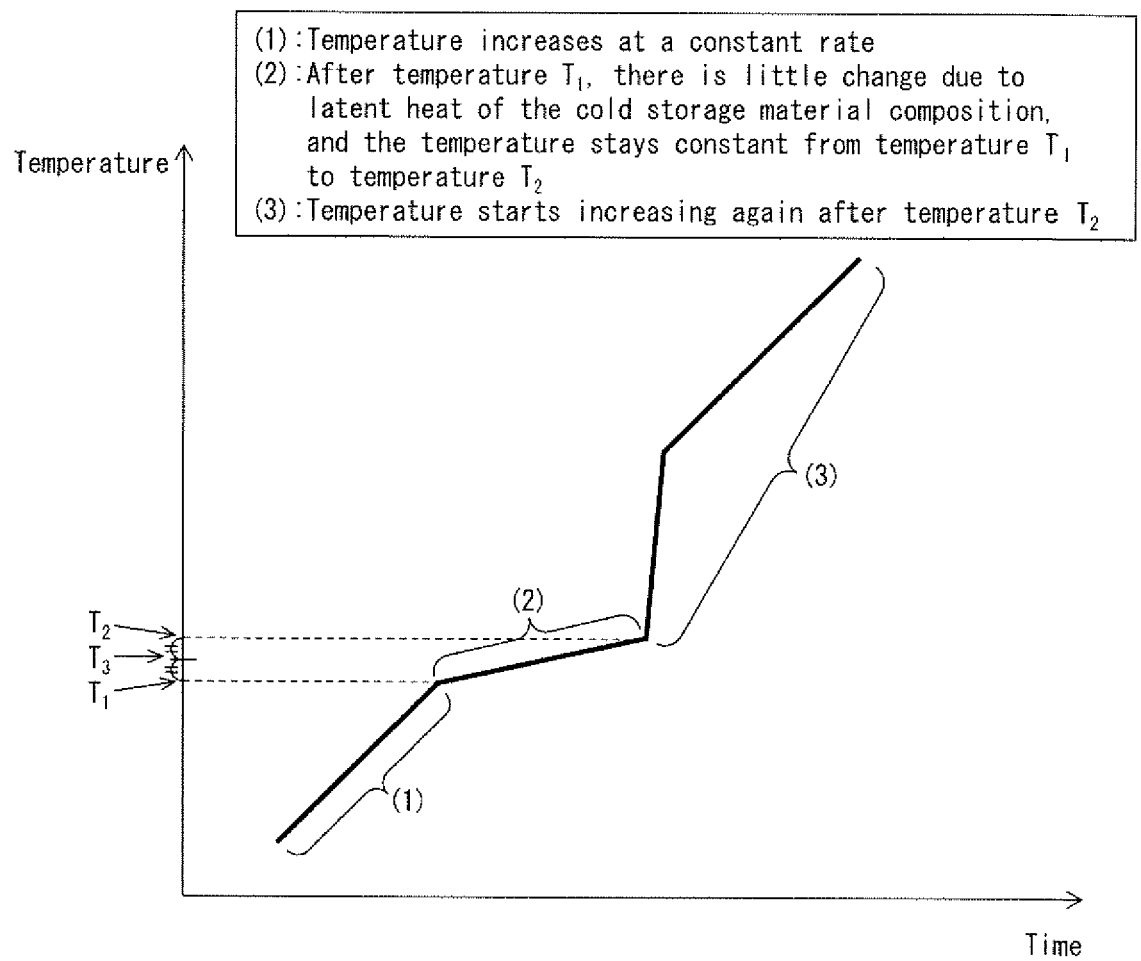
FIG. 1 is a graph plotting a change over time in temperature of a cold storage material composition when the cold storage material composition in a solidified state in accordance with an embodiment of the present invention was placed in a thermostatic bath, and the temperature of the thermostatic bath was then increased from a cryogenic temperature (e.g., −80° C.) at a constant rate of temperature increase.

The "melting temperature" of a cold storage material composition as used herein is intended to mean "a temperature at which the cold storage material composition in a solid state starts melting into a liquid state". The "melting temperature" will be more specifically discussed with reference to FIG. 1. FIG. 1 is a graph plotting a change over time in temperature of a cold storage material composition when the cold storage material composition in a solidified state in accordance with an embodiment of the present invention was placed in a thermostatic bath, and the temperature of the thermostatic bath was then increased from a cryogenic temperature at a constant rate of temperature increase. In comparison with the temperature of the thermostatic bath which is increased at a constant rate, the temperature of the cold storage material composition, as shown in FIG. 1, changes in the order of the following (1) to (3): (1) The temperature of the cold storage material composition increases at a constant rate; (2) after temperature $T_1$, there is little change due to latent heat of the cold storage material composition, and the temperature of the cold storage material composition stays constant from the temperature $T_1$ to temperature $T_2$; and (3) the temperature of the cold storage material composition starts increasing again after the temperature $T_2$. The temperature $T_1$ as used herein is referred to as "melting start temperature", and the temperature $T_2$ as used herein is referred to as "melting end temperature". A midpoint between the temperature $T_1$ and the temperature $T_2$, i.e., temperature $T_3$, is defined herein as "melting temperature".

The melting temperature of the cold storage material composition can be measured by (i) placing a measurement test sample in a commercially available thermostatic bath equipped with a temperature control unit, (ii) increasing or decreasing a temperature of the thermostatic bath at a certain rate, and (iii) monitoring a temperature of the test sample with the use of a thermocouple during the increasing or decreasing of the temperature of the thermostatic bath.

Further, in regard to the cold storage material composition in accordance with an embodiment of the present invention, a state in which the temperature of the cold storage material composition is maintained, in a period of time from the melting start temperature $T_1$ to the melting end temperature $T_2$, in a range from the melting start temperature $T_1$ to a temperature 3.0° C. higher than the melting start temperature $T_1$ due to the action of latent heat of the cold storage material composition is defined as "fixed-temperature maintenance". In a case where the cold storage material composition exhibits the fixed-temperature maintenance, the cold storage material composition is regarded as having fixed-temperature maintainability. The cold storage material composition preferably has fixed-temperature maintainability.

A melting temperature of a cold storage material composition is not particularly limited as long as it is in a range of −75° C. to −30° C., and can be set as appropriate according to different controlled temperatures required for a variety of temperature control target articles. For example, storage or transportation of an article such as a pharmaceutical product, a medical device, a specimen, an organ, a chemical substance, or food may require the controlled temperature to be equal to or lower than −40° C. Further, storage or transportation of specific active biopharmaceutical ingredients, regenerative cells, vaccines, and the like may require the controlled temperature to be equal to or lower than −60° C. Thus, from the viewpoint of being usable for a wide variety of temperature control target articles, a cold storage material composition in accordance with an embodiment of the present invention has a melting temperature preferably in a range of −75° C. to −35° C., more preferably in a range of −75° C. to −40° C., even more preferably in a range of −75° C. to −50° C., further more preferably in a range of −75° C. to −55° C., and particularly preferably in a range of −75° C. to −60° C. Further, a cold storage material composition in accordance with another embodiment of the present invention has a melting temperature preferably in a range of −70° C. to −30° C., more preferably in a range of −70° C. to −35° C., even more preferably in a range of −70° C. to −40° C., further more preferably in a range of −70° C. to −50° C., still further more preferably in a range of −70° C. to −55° C., and particularly preferably in a range of −70° C. to −60° C. Like the cold storage material composition, a cold storage material in accordance with an embodiment of the present invention preferably has a melting temperature in the above-described ranges.

[1-3. Method of Producing Cold Storage Material Composition]

A method of preparing a cold storage material composition containing water and two or more kinds of compounds in accordance with an embodiment of the present invention is not limited to any particular method and can be any publicly-known method. For example, the cold storage material composition can be prepared by (i) mixing the two or more kinds of compounds in advance by use of a tumbler mixer, a ribbon blender, or the like, (ii) putting a resultant mixture in a container, (iii) pouring water into the container, and (iv) stirring the mixture by use of a mixer or the like while cooling the container. Alternatively, the cold storage material composition can be prepared by (i) preparing respective aqueous solutions of the two or more kinds of compounds and (ii) mixing the aqueous solutions.

[2. Cold Storage Material]

A cold storage material in accordance with an embodiment of the present invention need only include the above-described cold storage material composition. Other components, materials, and the like of the cold storage material are not limited.

The cold storage material in accordance with an embodiment of the present invention is usable as a cold storage material of a latent heat type since a cold storage material composition which forms the cold storage material absorbs thermal energy in undergoing a phase transition from a solidified (solid) state to a molten (liquid) state (in other words, in melting). The cold storage material in accordance with an embodiment of the present invention can also be regarded as a melt-type latent heat cold storage material.

The cold storage material in accordance with an embodiment of the present invention can be obtained by, for example, charging the above-described cold storage material composition in a container, a bag, or the like.

The container or the bag is preferably made mainly of resin (e.g., synthetic resin) in order to prevent the cold storage material composition from leaking out due to rusting and corrosion caused by the cold storage material composition. Examples of the resin include polyvinyl chloride, polyethylene, polypropylene, polyethylene terephthalate, polystyrene, nylon, and polyester.

One of these materials can be used alone. Alternatively, two or more of the materials can be used in combination (e.g., by taking on a multilayer structure) in order to improve thermal resistance and barrier performance. From the viewpoint of handling and cost, the container or the bag is preferably made of polyethylene.

A shape of the container or the bag is not limited to any particular one. However, from the viewpoint of efficiently exchanging heat between the cold storage material composition and a temperature control target article or a space around the temperature control target article via the container or the bag, the container or the bag preferably has a shape that provides a small thickness and can secure a large surface area. A cold storage material can be produced by filling such a container or a bag with the cold storage material composition. Note that more specific examples of the container or the bag include a container and a bag disclosed in Japanese Patent Application Publication Tokukai No. 2015-78307, which is incorporated herein by reference.

[3. Transport Container]

A transport container in accordance with an embodiment of the present invention need only include the above-described cold storage material in accordance with an embodiment of the present invention. Other configurations, materials, and the like of the transport container are not particularly limited.

FIG. 2 illustrates an example of the transport container in accordance with an embodiment of the present invention. (a) of FIG. 2 is a perspective view schematically illustrating a cold storage material 10 in accordance with an embodiment of the present invention. (b) of FIG. 2 is an exploded perspective view schematically illustrating a transport container 1 in accordance with an embodiment of the present invention.

As illustrated in (a) and (b) of FIG. 2, a cold storage material 10 in accordance with the present embodiment is filled with a cold storage material composition 20 in accordance with an embodiment of the present invention which is charged through where a cap 11 of the cold storage material is provided. The cold storage material 10 can be used while being housed or placed in a thermal insulation container (transport container) 40.

A material of the cold storage material 10 and a material of the cap 11 for the cold storage material are not limited to any specific materials, and can be any materials known in the art.

The thermal insulation container 40 includes, for example, a box 41 and a lid 42 which fits an opening 410 of the box, so as to have a thermal insulation property.

A material of the thermal insulation container 40 is not limited to any specific material, provided that the material of the thermal insulation container 40 has a thermal insulation property. From the viewpoint of employing a lightweight and inexpensive material which can prevent dew condensation, it is suitable to employ a foamed plastic as the material of the thermal insulation container 40. From the viewpoint of employing a material which has an excellent thermal insulation property, which maintains a temperature for a long period of time and which can prevent dew condensation, it is suitable to use a vacuum thermal insulation material as the material of the thermal insulation container 40. Examples of the foamed plastic include foamed polyurethane, foamed polystyrene, foamed polyethylene, foamed polypropylene, foamed AS resin, and foamed ABS resin. Examples of the vacuum thermal insulation material include vacuum thermal insulation materials whose cores are made of silica powder, glass wool, and glass fiber. The thermal insulation container 40 can be constituted by a combination of the foamed plastic and the vacuum thermal insulation material. In such a case, a thermal insulation container 40 having a high thermal insulation performance can be produced by, for example, (i) covering, with the vacuum thermal insulation material, an outer surface or an inner surface of each of the box 41 and the lid 42 that are made of foamed plastic, or (ii) embedding the vacuum thermal insulation material in walls constituting each of the box 41 and the lid 42 that are made of foamed plastic.

(a) of FIG. 3 is a perspective view schematically illustrating an inside of the transport container 1. (b) of FIG. 3 is a cross-sectional view schematically illustrating a plane taken along the line A-A in (a) of FIG. 3.

As illustrated in (b) of FIG. 2, (i) the thermal insulation container 40 includes the box 41 and the lid 42, and (ii) the transport container 1 in accordance with an embodiment of the present invention includes the thermal insulation container 40, the cold storage materials 10, and spacers 6.

Although the transport container 1 includes 10 cold storage materials 10 in FIGS. 2 and 3, the number of cold storage materials included in the transport container 1 is not particularly limited, provided that at least one cold storage material is included in the transport container 1. The transport container 1 includes preferably two or more cold storage materials 10, more preferably four or more cold storage materials 10, even more preferably six or more cold storage materials 10, and particularly preferably ten or more cold storage materials 10, from the viewpoint of storing or transporting a temperature control target article at a controlled temperature for a long period of time and/or at a controlled temperature with stability. The number of cold storage materials 10 included in the transport container 1 may be selected as appropriate according to, for example, the size of a cold storage material 10, a period of time for which a temperature control target article is to be stored or transported, and an ambient temperature during storage or transportation of the temperature control target article.

As illustrated in FIGS. 2 and 3, the transport container 1 in accordance with an embodiment of the present invention can include the spacers 6 which, when the cold storage materials 10 are housed or placed in the transport container 1, are intended to (1) fill a space between (a) a surface of the lid 42 which covers a space in the box, lateral surfaces 412 of the box, and a bottom surface 411 of the box and (b) the cold storage materials 10 and (2) secure a space 5 for accommodating a temperature control target article as illustrated in (b) of FIG. 3.

A material of the spacers 6 is not limited to any specific material. Examples of the material include polyurethane, polystyrene, polyethylene, polypropylene, AS resin, ABS resin, and a foamed plastic obtained by foaming such a resin.

According to an embodiment of the present invention, a pair of spacers 6 is placed in the thermal insulation container 40 such that the spacers 6 face each other. In a case where the transport container 1 in accordance with an embodiment of the present invention includes the spacers 6, where to place the cold storage materials 10 is fixed. This makes packing easier. The size and number of spacers 6 included in the transport container 1 are not particularly limited, and can be set as appropriate according to, for example, the sizes of the transport container 1, the cold storage material 10, and a temperature control target article.

In FIGS. 2 and 3, one space 5 for accommodating the temperature control target article is included in the transport container 1. However, any number of spaces 5 can be included in the transport container 1, provided that at least one space 5 is included in the transport container 1. Alternatively, a plurality of spaces 5 can be included in the transport container 1. For example, separate spaces 5 may be available by placing the cold storage material(s) 10 and/or the spacer(s) 6 in one space 5.

With the transport container in accordance with an embodiment of the present invention, it is possible to store or transport an article that requires temperature control (i.e., temperature control target article), while the article is maintained at a temperature in a range of −75° C. to −30° C. for a long period of time regardless of an ambient temperature. The transport container in accordance with the present embodiment can be suitably used to store or transport various kinds of articles such as cells, pharmaceutical products, medical devices, specimens, organs, chemical substances, food, and the like that require temperature control. As described above, the transport container in accordance with an embodiment of the present invention, which can maintain a temperature control target article at a temperature in a range of −75° C. to −30° C. for a long period of time, can also be regarded as "temperature keeping container".

Further, storage or transportation of some of the temperature control target articles, such as regenerative cells, vaccines, antibodies, gene therapy vectors, and the like, may require the controlled temperature to be equal to or lower than −60° C. Thus, for these applications, a transport container capable of storing or transporting the articles while maintaining the articles at not more than −60° C. (for example, a transport container capable of storing or transporting the articles while maintaining the articles at not less than −75° C. and not more than −60° C.) in accordance with an embodiment of the present invention can be suitably used. Note that examples of the applications for which the transport container storing or transporting the articles while maintaining the articles at not more than −60° C. is used include transport of cells (e.g., transport of frozen cells inside a cell culture center, transport of frozen cells from one facility to another facility (for example, from a cell bank to a cell culture center), and the like) and storage of cells (e.g., temporary storage of frozen cells in a sterile room or a clean bench, a back-up application at a power failure of a deep freezer used in the cell bank or the cell culture center, and the like).

Note that more specifically, the thermal insulation container described above can be configured as disclosed in Japanese Patent Application Publication Tokukai No. 2015-78307, which is incorporated herein by reference.

[4. Method of Using Cold Storage Material Composition]

Still another embodiment of the present invention is directed to a method of using a cold storage material composition, including: a solidifying step of keeping a cold storage material composition at a temperature lower than a melting temperature of the cold storage material composition to solidify the cold storage material composition, the cold storage material composition including a multicomponent eutectic which is composed of water and two or more kinds of compounds; and a maintaining step of maintaining part or whole of a target object at not less than −75° C. to not more than −30° C. under an environment with a temperature which exceeds the melting temperature of the cold storage material composition.

Further, still another embodiment of the present invention is directed to a method of using a cold storage material composition, including: a solidifying step of keeping a cold storage material composition at a temperature lower than a melting temperature of the cold storage material composition to solidify the cold storage material composition, the cold storage material composition including water, calcium ions, chloride ions, and bromide ions; and a maintaining step of maintaining part or whole of a target object at not less than −75° C. to not more than −30° C. under an environment with a temperature which exceeds the melting temperature of the cold storage material composition, the cold storage material composition including 0.1 mol to 18 mol of the calcium ions, 0.1 mol to 19 mol of the chloride ions, and 0.1 mol to 20 mol of the bromide ions, relative to 100 mol of the water.

Note that the cold storage material composition in accordance with another embodiment of the present invention is preferably the cold storage material composition in accordance with the embodiment of the present invention. In the description of the cold storage material composition, the description in the [1. Cold storage material composition] section can be incorporated as appropriate.

Here, in the present specification, the "target object" is intended to mean a temperature control target article or a surrounding environment (including a vapor phase, a liquid phase, and a solid phase) of the temperature control target article.

Specifically, the using method in accordance with still another embodiment of the present invention can be provided in any of the following aspects (1) to (5):

(1) A method of using a cold storage material composition as follows: That is, the cold storage material described in the [2. Cold storage material] section is prepared by charging a cold storage material composition into a container or the like. Thereafter, the cold storage material is kept at a temperature lower than a melting temperature of the cold storage material composition to solidify the cold storage material (solidifying step). The solidified cold storage material is placed in the transport container described in the [3. Transport container] section, and the target object is stored and/or transported while the target object is maintained at −75° C. to −30° C. under an environment with a temperature which exceeds a melting temperature of the cold storage material composition (maintaining step).

(2) A method of using a cold storage material composition as follows: That is, the cold storage material described in the [2. Cold storage material] section, which has been prepared by charging a cold storage material composition is put in advance in a freezer, a cryogenic freezer, or the like which is operated at a temperature lower than a melting temperature of the cold storage material composition (solidifying step). In this way, during a power failure, a target object in the freezer or the cryogenic freezer is stored while the target object is maintained at −75° C. to −30° C. (maintaining step).

(3) A method of using a cold storage material composition as follows: That is, in preparing the cold storage material described in the [2. Cold storage material] section by charging a cold storage material composition into a container or the like, the cold storage material composition in a liquid state and a target object are put in the container so that the target object is embedded in the cold storage material composition. Thereafter, the cold storage material is solidified by keeping the cold storage material at a temperature lower than a melting temperature of the cold storage material composition (solidifying step), so that the target object is stored and/or transported while the target object is maintained at −75° C. to −30° C. under an environment with a temperature which exceeds the melting temperature of the cold storage material composition (maintaining step).

(4) A method of using a cold storage material composition as follows: That is, the cold storage material described in the [2. Cold storage material] section is prepared by charging a cold storage material composition into a container or the like. Thereafter, the cold storage material is kept at a temperature lower than a melting temperature of the cold storage material composition to solidify the cold storage material (solidifying step). The solidified cold storage material is brought into contact with a target object which is present under an environment with a temperature which exceeds a melting temperature of the cold storage material composition, and a contacting part (one part) of the target object is maintained at −75° C. to −30° C. (maintaining step).

(5) A method of using a cold storage material composition as follows: That is, after a cold storage material composition in a liquid state is embedded in a target object, the cold storage material composition is kept at a temperature lower than a melting temperature of the cold storage material composition to solidify the cold storage material composition (solidifying step). In this way, the target object is stored and/or transported while the target object is maintained at −75° C. to −30° C. under an environment with a temperature which exceeds a melting temperature of the cold storage material composition (maintaining step).

In the using methods in (1) to (5) above, a specific method for keeping a cold storage material composition or the cold storage material described in the [2. Cold storage material] section at a temperature lower than a melting temperature of the cold storage material composition to solidify the cold storage material composition or the cold storage material is exemplified by the following method: That is, a method of putting the cold storage material composition or the cold storage material in a commercially available freezer whose temperature can be adjusted to a temperature lower than the melting temperature of the cold storage material composition, preferably a cryogenic freezer whose temperature can be adjusted to a temperature equal to or lower than −80° C., to solidify the cold accumulating material composition or the cold storage material.

In the above-described method of using a cold storage material composition in accordance with still another embodiment of the present invention, to solidify the cold storage material composition in the solidifying step, the cold storage material composition is kept at preferably a temperature equal to or lower than −80° C., more preferably a temperature equal to or lower than −85° C., and even more preferably a temperature equal to or lower than −100° C. In this way, the cold storage material composition can be sufficiently solidified in a short period of time.

Although some specific examples of the method of using a cold storage material composition have been given above, the method of using a cold storage material composition in accordance with still another embodiment of the present invention is not limited to those examples of the using method. The method of using a cold storage material composition provided by still another embodiment of the present invention encompasses any method including: (i) a solidifying step of keeping a cold storage material composition in accordance with an embodiment of the present invention at a temperature lower than a melting temperature of the cold storage material composition to solidify the cold storage material composition; and (ii) a maintaining step of maintaining part or whole of a target object at −75° C. to −30° C. by use of latent heat of melting of the solidified cold storage material composition under an environment with a temperature which exceeds the melting temperature of the cold storage material composition.

An embodiment of the present invention can also be configured as below.

[1] A cold storage material composition including a multicomponent eutectic which is composed of water and two or more kinds of compounds, the cold storage material composition having a melting temperature in a range of −75° C. to −30° C.

[2] The cold storage material composition as set forth in [1], in which the two or more kinds of compounds are inorganic salts.

[3] The cold storage material composition as set forth in [1] or [2], in which the multicomponent eutectic is a three-component eutectic.

[4] The cold storage material composition as set forth in [2], in which the inorganic salts include a calcium salt.

[5] The cold storage material composition as set forth in [2] or [4], in which the inorganic salts include a chloride salt (A) and a bromide salt (B).

[6] The cold storage material composition as set forth in [5], in which the chloride salt (A) is calcium chloride.

[7] The cold storage material composition as set forth in [5] or [6], in which the bromide salt (B) is at least one selected from a group consisting of ammonium bromide, potassium bromide, sodium bromide, and calcium bromide.

[8] The cold storage material composition as set forth in any one of [5] to [7], in which a molar ratio between the chloride salt (A) and the bromide salt (B) (bromide salt (B)/chloride salt (A)) is in a range of 0.1 to 10.

[9] The cold storage material composition as set forth in any one of [1] to [8], in which the melting temperature is in a range of −75° C. to −60° C.

[10] A cold storage material composition including 0.1 mol to 18 mol of calcium ions, 0.1 mol to 19 mol of chloride ions, and 0.1 mol to 20 mol of bromide ions, relative to 100 mol of water, the cold storage material composition having a melting temperature in a range of −75° C. to −30° C.

[11] The cold storage material composition as set forth in [10], in which the melting temperature is in a range of −75° C. to −60° C.

[12] A cold storage material including a cold storage material composition described in any one of [1] to [11].

[13] A transport container including a cold storage material described in [12].

[14] A method of using a cold storage material composition, including: a solidifying step of keeping a cold storage material composition at a temperature lower than a melting temperature of the cold storage material composition to solidify the cold storage material composition, the cold storage material composition including a multicomponent eutectic which is composed of water and two or more kinds of compounds; and a maintaining step of maintaining part or whole of a target object at not less than −75° C. to not more than −30° C. under an environment with a temperature which exceeds the melting temperature of the cold storage material composition.

[15] The method as set forth in [14], in which the two or more kinds of compounds are inorganic salts.

[16] The method as set forth in [14] or [15], in which the multicomponent eutectic is a three-component eutectic.

[17] The method as set forth in [15], in which the inorganic salts include a calcium salt.

[18] The method as set forth in [15] or [17], in which the inorganic salts include a chloride salt (A) and a bromide salt (B).

[19] The method as set forth in [18], in which the chloride salt (A) is calcium chloride.

[20] The method as set forth in [18] or [19], in which the bromide salt (B) is at least one selected from a group consisting of ammonium bromide, potassium bromide, sodium bromide, and calcium bromide.

[21] The method as set forth in any one of [18] to [20], in which a molar ratio between the chloride salt (A) and the bromide salt (B) (bromide salt (B)/chloride salt (A)) is in a range of 0.1 to 10.

[22] A method of using a cold storage material composition, including: a solidifying step of keeping a cold storage material composition at a temperature lower than a melting temperature of the cold storage material composition to solidify the cold storage material composition, the cold storage material composition including water, calcium ions, chloride ions, and bromide ions; and a maintaining step of maintaining part or whole of a target object at not less than −75° C. to not more than −30° C. under an environment with a temperature which exceeds the melting temperature of the cold storage material composition, the cold storage material composition including 0.1 mol to 18 mol of the calcium ions, 0.1 mol to 19 mol of the chloride ions, and 0.1 mol to 20 mol of the bromide ions, relative to 100 mol of the water.

[23] The method described in any one of [14] to [22], in which the solidifying step includes keeping the cold storage material composition at a temperature equal to or lower than −80° C. to solidify the cold storage material composition.

[24] The method described in any one of [14] to [23], in which the maintaining step includes maintaining the part or whole of the target object at not less than −75° C. to not more than −60° C.

Alternatively, an embodiment of the present invention can be configured as below.

[1] A cold storage material composition including a multicomponent eutectic which is composed of water and two or more kinds of compounds, the cold storage material composition having a melting temperature in a range of −70° C. to −30° C.

[2] The cold storage material composition as set forth in [1], in which the two or more kinds of compounds are inorganic salts.

[3] The cold storage material composition as set forth in [1] or [2], in which the multicomponent eutectic is a three-component eutectic.

[4] The cold storage material composition as set forth in [2], in which the inorganic salts include a chloride salt (A) and a bromide salt (B).

[5] The cold storage material composition as set forth in [4], in which the chloride salt (A) is calcium chloride.

[6] The cold storage material composition as set forth in [4] or [5], in which the bromide salt (B) is at least one selected from a group consisting of ammonium bromide, potassium bromide, and sodium bromide.

[7] The cold storage material composition as set forth in any one of [4] to [6], in which a molar ratio between the chloride salt (A) and the bromide salt (B) (bromide salt (B)/chloride salt (A)) is in a range of 0.5 to 10.

[8] The cold storage material composition as set forth in any one of [1] to [7], in which the melting temperature is in a range of −70° C. to −60° C.

[9] A cold storage material including a cold storage material composition described in any one of [1] to [8].

[10] A transport container including a cold storage material described in [9].

Alternatively, an embodiment of the present invention can be configured as below.

[1] A cold storage material composition including water, calcium chloride, and calcium bromide and having a melting temperature in a range of not less than −75° C. to not more than −55° C.

[2] A cold storage material including a cold storage material composition described in [1].

[3] A temperature keeping container including a cold storage material described in [2].

[4] A use method in which a composition including water, calcium chloride, and calcium bromide is kept at a temperature lower than a melting temperature of the composition to solidify the composition, and part or whole of a target object is maintained at not less than −75° C. to not more than −55° C. by latent heat of melting of the solidified composition under an environment with a temperature which exceeds the melting temperature.

[5] The method as set forth in [4], in which the temperature lower than the melting temperature is a temperature equal to or lower than −80° C.

The configurations described in the above items can also be applied in other item(s) as appropriate. The following description will more specifically discuss the present invention with reference to Examples. However, the present invention is not limited to such Examples.

EXAMPLES

The following materials were used in Examples and Comparative Examples.

Chloride salt (A): Calcium chloride [Calcium chloride for water content measurement, Molecular weight=110.98, available from Wako Pure Chemical Industries, Ltd.]

Bromide salt (B):
Ammonium bromide [Ammonium bromide, Molecular weight=97.94, available from Manac Incorporated];
Potassium bromide [Potassium bromide, Molecular weight=119.00, available from Wako Pure Chemical Industries, Ltd.];
Sodium bromide [Sodium bromide, Molecular weight=102.89, available from Wako Pure Chemical Industries, Ltd.]; and
Calcium bromide [Calcium bromide hydrate, 98%, available from Strem Chemicals, Incorporated]

Inorganic salt (C):
Sodium chloride [Sodium chloride, Molecular weight=58.44, available from Wako Pure Chemical Industries, Ltd.]; and
Ammonium chloride [Ammonium chloride, Molecular weight=53.49, available from Yamamoto Seisakusho, Inc.]

Organic substance (D):
Ethanol [Ethanol (99.5), Molecular weight=46.07, available from Wako Pure Chemical Industries, Ltd.]

Inorganic salt (E):
Magnesium chloride [Anhydrous magnesium chloride, Molecular weight=95.21, available from Wako Pure Chemical Industries, Ltd.]

Water: Drinking tap water

<Preparation of Cold Storage Material Composition>

A cold storage material composition was prepared by (i) preparing respective aqueous solutions of the compounds and (ii) mixing the aqueous solutions.

Measurements and evaluations in Examples and Comparative Examples were carried out under the following conditions and procedures.

<Three-Component Eutectic Determination>

Whether a three-component eutectic was present was determined based on the above conditions (1) and condition (2). Note that in the present specification, the "melting temperatures of two-component systems" in the condition (1) are melting temperatures of the two-component systems which were obtained by mixture with the compositions in Comparative Examples in Table 3 or 4 described later. In regard to some compounds, the melting temperature is denoted as "eutectic point with water" in Tables 1 to 4. Further, in the present specification, it is determined that the condition (2) is satisfied in a case where the amount by which the melting temperature changes with a 0.5 mol change in molar quantity of at least one of the compounds blended in the amounts (molar quantity) shown in Tables 1 to 4 described later, falls within 1.0° C.

<Melting Temperature>

A cold storage material composition charged in a cryovial made of polypropylene was allowed to stand still in an ultracold thermostatic bath [Ultracold aluminum block thermostatic bath CRYO PORTER (registered trademark) CS-80CP, available from Scinics Corporation], and the temperature of the thermostatic bath was then increased or decreased at a rate of temperature increase/decrease of 0.5° C./min in a temperature range of −80° C. to 20° C.

After the cold storage material composition had been solidified at −80° C., the temperature was increased at the above rate of temperature increase in the above temperature range. A change over time in temperature of the cold storage material composition in the thermostatic bath as measured in the course of the temperature increase was plotted into FIG. 1. In comparison with the temperature of the thermostatic bath which was increased at a constant rate, the temperature of the cold storage material composition, as shown in FIG. 1, changed in the order of the following (1) to (3): (1) The temperature of the cold storage material composition increased at a constant rate; (2) after temperature $T_1$, there was little change due to latent heat of the cold storage material composition, and the temperature of the cold storage material composition stayed constant from the temperature $T_1$ to temperature $T_2$; and (3) the temperature of the cold storage material composition started increasing again after the temperature $T_2$. A midpoint between the temperature $T_1$ and the temperature $T_2$, i.e., temperature $T_3$, is defined herein as "melting temperature".

In regard to the melting temperature, whether the melting temperature was −30° C. or lower was determined, whether the melting temperature was −55° C. or lower was determined, and whether the melting temperature was −60° C. or lower was determined. In the determinations, the cold storage material composition was rated as "G" (hereinafter "G" means "Good") in a case where the melting temperature fell within any of the above ranges, and the cold storage material composition was rated as "P" (hereinafter "P" means "Poor") in a case where the melting temperature fell outside the above ranges.

<Fixed-Temperature Maintainability>

In a temperature change plot of the cold storage material composition which plot was obtained in the course of temperature increase in the ultracold aluminum block thermostatic bath, results of evaluations as to whether the cold storage material composition had fixed-temperature maintainability in the aforementioned definition were provided in Tables below. Specifically, in the cold storage material compositions in Tables 1 and 3, a state in which the temperature of the cold storage material composition was maintained, in a period of time from the melting start temperature $T_1$ to the melting end temperature $T_2$, in a range from the melting start temperature $T_1$ to a temperature 2.0° C. higher than the melting start temperature $T_1$ due to the action of latent heat of the cold storage material composition was determined as "fixed-temperature maintenance". Further, in the cold storage material compositions in Tables 2 and 4, a state in which the temperature of the cold storage material composition was maintained, in a period of time from the melting start temperature $T_1$ to the melting end temperature $T_2$, in a range from the melting start temperature $T_1$ to a temperature 3.0° C. higher than the melting start temperature $T_1$ due to the action of latent heat of the cold storage material composition was determined as "fixed-temperature maintenance". In Tables 1 to 4, in a case where the cold storage material composition exhibited the fixed-temperature maintenance, the cold storage material composition was regarded as having fixed-temperature maintainability. In the evaluation of fixed-temperature maintainability, the cold storage material composition having fixed-temperature maintainability was rated as "G", and the cold storage material composition having no fixed-temperature maintainability was rated as P.

In the temperature change plot of the cold storage material composition which plot was obtained in the course of temperature increase in the ultracold aluminum block thermostatic bath, a duration of a fixed-temperature maintaining state (in other words, a period of time from the melting start temperature $T_1$ to the melting end temperature $T_2$) was measured. In a case where the cold storage material composition had no fixed-temperature maintainability, the duration was evaluated as zero (0) minute. Further, in regard to the evaluation as to the duration, in a case where the duration was shorter than 5 minutes, the cold storage material composition was rated as P. In a case where the duration was not shorter than 5 minutes and shorter than 16 minutes, the cold storage material composition was rated as G. In a case where the duration was longer than 16 minutes, the cold storage material composition was rated as "E" (hereinafter "E" means "excellent").

<Repeatability>

In the ultracold aluminum block thermostatic bath, the cold storage material compositions shown in Tables 1 and 3 were each subjected to 4 to 20 cycles of temperature change cycling including temperature increase and temperature decrease at a constant temperature increase/decrease rate in a temperature range of −80° C. to 20° C. (also referred to as cycle test). Whether or not there was cycle-to-cycle variation in the melting temperature and whether or not the fixed-temperature maintainability was exhibited in each cycle were evaluated based on the following criterions.

Excellent (E): In all of the cycles, the same melting temperature was shown, and the fixed-temperature maintaining state was maintained for a certain period of time, without variation between the cycles.

Good (G): The same melting temperature was shown, and the fixed-temperature maintaining state was maintained for a certain period of time at a probability of not less than 80% and less than 100%, without variation between the cycles.

Fair (F): The same melting temperature was shown, and the fixed-temperature maintaining state was maintained for a certain period of time at a probability of not less than 10% and less than 80%, without variation between the cycles.

Poor (P): The same melting temperature was shown, and the fixed-temperature maintaining state was maintained for a certain period of time at a probability of less than 10%, without variation between the cycles.

<Melting Behavior Repeating Probability>

In the ultracold aluminum block thermostatic bath, the cold storage material compositions shown in Tables 2 and 4 were each subjected to 4 cycles of temperature change cycling including temperature increase and temperature decrease at a constant temperature increase/decrease rate in a temperature range of −80° C. to 20° C. (also referred to as cycle test). In each of the cycles, four samples were used. That is, results of 16 cycle tests in total (four samples×4 cycles) were obtained. Thereafter, in each cycle, whether or not the melting temperature and the fixed-temperature maintainability were repeated was determined. Regarding the presence or absence of repeatability of the melting temperature, in a case where the melting temperature was not lower than −75° C. and not higher than −55° C., it was determined that the cold storage material composition had repeatability. In a case where the melting temperature was higher than −55° C., it was determined that the cold storage material composition had no repeatability. Regarding the presence or absence of repeatability of the fixed-temperature maintainability, in a case where the temperature of the cold storage material composition was maintained, in a period of time from the melting start temperature $T_1$ to the melting end temperature $T_2$ in FIG. 1, in a range from the melting start temperature $T_1$ to a temperature 3.0° C. higher than the melting start temperature $T_1$, it was determined that the cold storage material composition had repeatability of the fixed-temperature maintainability. In a case where the temperature of the cold storage material composition was maintained, in a period of time from the melting start temperature $T_1$ to the melting end temperature $T_2$ in FIG. 1, in a range from the melting start temperature $T_1$ to a temperature 3.0° C. or more higher than the melting start temperature $T_1$, it was determined that the cold storage material composition had no repeatability of the fixed-temperature maintainability. For one standard, the cycle test was carried out 16 times in total, and the number of times the melting temperature and the fixed-temperature maintainability were exhibited at one time was denoted as X.

The melting behavior repeating probability (%) was calculated as follows:

Melting behavior repeating probability (%)=100X/16

In a case where the melting behavior repeating probability exceeds 50%, it is determined that the cold storage material composition is good. In a case where the melting behavior repeating probability is 100%, it is determined that the cold storage material composition is excellent. Further, in a case where the melting temperature of the cold storage material composition exceeded −55° C., evaluation of repeatability was not carried out.

<Volume Expansion>

In regard to the cold storage material composition, after completion of a cycle test in which the cold storage material composition was repeatedly solidified and melted, whether or not the cold storage material composition expanded in volume during solidification was evaluated with use of a container which was filled with the cold storage material composition. The evaluation was carried out as follows: (i) the cold storage material composition charged in a cryovial made of polypropylene was allowed to stand still in the ultracold aluminum block thermostatic bath, (ii) the cold storage material composition was then subjected to 4 to 20 cycles of temperature increase or temperature decrease at a temperature increase/decrease rate of 0.5° C./min in a temperature range of −80° C. to 20° C., and (iii) an appearance of the cryovial was visually observed. In a case where volume expansion of the cryovial was observed, the cold storage material composition was rated as P. In a case where volume expansion of the cryovial was not observed, the cold storage material composition was rated as "G".

<Ease of Handling>

In a case where the cold storage material composition generates harmful fumes and has the properties of a strong alkali, a strong acid, and the like, the cold storage material composition is difficult to handle. Thus, the cold storage material composition that generated no harmful fumes and was not strongly alkaline or strongly acid was rated as "G", and the cold storage material composition that generated harmful fumes and was strongly alkaline or strongly acid was rated as "P".

<Practicality Evaluation>

Based on the melting temperature of −75° C. to −30° C. and the evaluation results described above, the cold storage material composition that exhibited excellent practicality was rated as "E", the cold storage material composition that exhibited good practicality was rated as "G", the cold storage material composition that exhibited poor practicality was rated as "P". Specifically, the criterions are as follows:

"E (Excellent)": The evaluation results are "E" or "G" and include at least one "E".

"G (Good)": The evaluation results are "G" or "F".

"P (Poor)": The evaluation results include at least one "P".

<Evaluation Results>

The respective evaluation results are shown in Tables 1 to 4. Note that "Amount of material" shown in Tables 1 to 4 indicates "molar quantity" of each of the materials contained in the obtained cold storage material composition.

TABLE 1

| | | | | | Ex. 1 | Ex. 2 | Ex. 3 | Ex. 4 | Ex. 5 | Ex. 6 | Ex. 7 |
|---|---|---|---|---|---|---|---|---|---|---|---|
| Three-component eutectic evaluation | Condition (1) | Lower melting temperature than melting temperatures of two-component systems | | | G | G | G | G | G | G | G |
| | Condition (2) | Unchanged melting temperature with change in concentration ratio and/or molar quantity | | | G | G | G | G | G | G | G |
| | Evaluation | Three-component eutectic | | | G | G | G | G | G | G | G |
| Ion concentration | Calcium ion (Ca$^{2+}$) | | | Number of moles relative to 100 mol of water | 5 | 5 | 5 | 4 | 4 | 3 | 2 |
| | Chloride ion (Cl$^−$) | | | | 10 | 10 | 10 | 8 | 8 | 6 | 4 |
| | Bromide ion (Br$^−$) | | | | 5 | 4 | 7 | 8 | 5.5 | 5.5 | 5.5 |
| Amount of material | | | Eutectic point with water | | | | | | | | |
| | Chloride salt (A) | Calcium chloride | −51.5 | Number of moles relative to 100 mol of water | 5 | 5 | 5 | 4 | 4 | 3 | 2 |
| | Bromide salt (B) | Ammonium bromide | −16.0 | | 5 | 4 | 7 | 8 | 5.5 | 5.5 | 5.5 |
| | | Potassium bromide | −12.4 | | — | — | — | — | — | — | — |
| | | Sodium bromide | −27.0 | | — | — | — | — | — | — | — |
| | Inorganic salt (C) | Sodium chloride | −20.9 | | — | — | — | — | — | — | — |
| | | Ammonium chloride | −15.1 | | — | — | — | — | — | — | — |
| | Organic substance (D) | Ethanol | — | | — | — | — | — | — | — | — |
| | Inorganic salt (E) | Magnesium chloride | −32.1 | | — | — | — | — | — | — | — |
| | Molar ratio (bromide salt (B)/chloride salt (A)) | | | | 1.0 | 0.8 | 1.4 | 2.0 | 1.4 | 1.8 | 2.8 |
| Evaluation results | Rate of temperature increase/decrease 0.5° C./min | Melting temperature | | ° C. | −64.1 | −63.7 | −64.3 | −64.2 | −64.2 | −64.0 | −63.8 |
| | | Fixed-temperature maintainability | | — | Present | Present | Present | Present | Present | Present | Present |
| | | Duration | | min | 16 | 15 | 15 | 13 | 13 | 11 | 9 |
| | Melting temperature of not more than −30° C. | | | | G | G | G | G | G | G | G |
| | Melting temperature of not more than −55° C. | | | | G | G | G | G | G | G | G |
| | Melting temperature of not more than −60° C. | | | | G | G | G | G | G | G | G |
| | Duration | | | | E | G | G | G | G | G | G |
| | Volume expansion | | | | G | G | G | G | G | G | G |
| | Repeatability | | | | E | G | G | G | G | G | G |
| | Ease of handling | | | | G | G | G | G | G | G | G |
| | Practicality evaluation | | | | E | G | G | G | G | G | G |

| | | | | | Ex. 8 | Ex. 9 | Ex. 10 | Ex. 11 | Ex. 12 | Ref. Ex. 1 |
|---|---|---|---|---|---|---|---|---|---|---|
| Three-component eutectic evaluation | Condition (1) | Lower melting temperature than melting temperatures of two-component systems | | | G | G | G | G | G | — |
| | Condition (2) | Unchanged melting temperature with change in concentration ratio and/or molar quantity | | | G | G | G | G | G | — |
| | Evaluation | Three-component eutectic | | | G | G | G | G | G | — |

TABLE 1-continued

| | | | | | | | | | | |
|---|---|---|---|---|---|---|---|---|---|---|
| Ion concentration | Calcium ion (Ca$^{2+}$) | | | Number of moles relative to 100 mol of water | 1 | 4 | 4 | 4 | 4 | — |
| | Chloride ion (Cl$^-$) | | | | 2 | 8 | 8 | 8 | 8 | — |
| | Bromide ion (Br$^-$) | | | | 5.5 | 3 | 4 | 4 | 4.5 | — |
| Amount of material | | | Eutectic point with water | | | | | | | |
| | Chloride salt (A) | Calcium chloride | −51.5 | Number of moles relative to 100 mol of water | 1 | 4 | 4 | 4 | 4 | — |
| | Bromide salt (B) | Ammonium bromide | −16.0 | | 5.5 | — | — | — | — | — |
| | | Potassium bromide | −12.4 | | — | 3 | 4 | — | — | — |
| | | Sodium bromide | −27.0 | | — | — | — | 4 | 4.5 | — |
| | Inorganic salt (C) | Sodium chloride | −20.9 | | — | — | — | — | — | 8.2 |
| | | Ammonium chloride | −15.1 | | — | — | — | — | — | 4.4 |
| | Organic substance (D) | Ethanol | — | | — | — | — | — | — | — |
| | Inorganic salt (E) | Magnesium chloride | −32.1 | | — | — | — | — | — | — |
| | Molar ratio (bromide salt (B)/chloride salt (A)) | | | | 5.5 | 0.8 | 1.0 | 1.0 | 1.1 | — |
| Evaluation results | Rate of temperature increase/decrease 0.5° C./min | Melting temperature | | ° C. | −64.0 | −63.4 | −63.7 | −64.8 | −65.2 | −24.0 |
| | | Fixed-temperature maintainability | | — | Present | Present | Present | Present | Present | Present |
| | | Duration | | min | 7 | 14 | 13 | 15 | 12 | 30 |
| | Melting temperature of not more than −30° C. | | | | G | G | G | G | G | P |
| | Melting temperature of not more than −55° C. | | | | G | G | G | G | G | P |
| | Melting temperature of not more than −60° C. | | | | G | G | G | G | G | P |
| | Duration | | | | G | G | G | G | G | E |
| | Volume expansion | | | | G | G | G | G | G | — |
| | Repeatability | | | | G | F | F | F | F | G |
| | Ease of handling | | | | G | G | G | G | G | G |
| | Practicality evaluation | | | | G | G | G | G | G | — |

The evaluation results of Examples 1 to 12 are shown in Table 1. All of the cold storage material compositions prepared in Examples 1 to 12 include water, the chloride salt (A), and the bromide salt (B).

In Examples 1 to 12, it was shown that each of the cold storage material compositions was a three-component eutectic, and the melting temperature was equal to or lower than −60° C. Further, in Examples 1 to 8, all of the evaluation results were "E (Excellent)" or "G (Good)" in "Fixed-temperature maintainability" "Duration", "Volume expansion", "Repeatability", and "Ease of handling", which showed excellent practicality or good practicality. In Examples 9 to 12, the evaluation results were "G (Good)" in "Fixed-temperature maintainability" "Duration", "Volume expansion", and "Ease of handling" which showed good practicality.

Reference Example 1 in Table 1 contains water and further contains, as the chloride salt (A), sodium chloride and ammonium chloride. In Reference Example 1, the melting temperature was −24.0° C. Reference Example 1 was excellent in "Fixed-temperature maintainability", "Duration", and "Repeatability".

TABLE 2

| | | | | Ex. 13 | Ex. 14 | Ex. 15 | Ex. 16 | Ex. 17 |
|---|---|---|---|---|---|---|---|---|
| Three-component eutectic evaluation | Condition (1) | Lower melting temperature than melting temperatures of two-component systems | | G | G | G | G | G |
| | Condition (2) | Unchanged melting temperature with change in concentration ratio and/or molar quantity | | G | G | G | G | G |
| | Evaluation | Three-component eutectic | | G | G | G | G | G |
| Ion concentration | Calcium ion (Ca$^{2+}$) | | Number of moles relative to 100 mol of water | 8 | 6.5 | 12 | 15.5 | 6.5 |
| | Chloride ion (Cl$^-$) | | | 6 | 5 | 6 | 17 | 11 |
| | Bromide ion (Br$^-$) | | | 10 | 8 | 18 | 14 | 2 |
| Amount of material | | | Eutectic point with water | | | | | |
| | Chloride salt (A) | Calcium chloride | −51.5 | Number of moles relative to 100 mol of water | 3 | 2.5 | 3 | 8.5 | 5.5 |
| | Bromide salt (B) | Calcium bromide | — | | 5 | 4 | 9 | 7 | 1 |
| | Inorganic salt (C) | Sodium chloride | −20.9 | | — | — | — | — | — |
| | Inorganic salt (E) | Magnesium chloride | −32.1 | | — | — | — | — | — |
| | Molar ratio (bromide salt (B)/chloride salt (A)) | | | 1.7 | 1.6 | 3.0 | 0.8 | 0.2 |

TABLE 2-continued

| | | | | | | | | |
|---|---|---|---|---|---|---|---|---|
| Evaluation results | Rate of temperature increase/ decrease 0.5° C./min | Melting temperature | ° C. | −65.9 | −64.7 | −67.9 | −68.2 | −63.8 |
| | | Fixed-temperature maintainability | — | G | G | G | G | G |
| | | Duration | min | 15 | 12 | 15 | 10 | 6 |
| | Melting behavior repeating probability | | % | 81 | 100 | 100 | 100 | 63 |
| | Melting temperature of not more than −30° C. | | | G | G | G | G | G |
| | Melting temperature of not more than −55° C. | | | G | G | G | G | G |
| | Melting temperature of not more than −60° C. | | | G | G | G | G | G |
| | Duration | | | G | G | G | G | G |
| | Volume expansion | | | G | G | G | G | G |
| | Ease of handling | | | G | G | G | G | G |
| | Practicality evaluation | | | E | E | E | E | E |

| | | | | Ex. 18 | Ex. 19 | Ex. 20 |
|---|---|---|---|---|---|---|
| Three-component eutectic evaluation | Condition (1) | Lower melting temperature than melting temperatures of two-component systems | | G | G | G |
| | Condition (2) | Unchanged melting temperature with change in concentration ratio and/or molar quantity | | G | G | G |
| | Evaluation | Three-component eutectic | | G | G | G |
| Ion concentration | Calcium ion ($Ca^{2+}$) | | Number of moles relative to 100 mol of water | 8 | 9 | 8 |
| | Chloride ion ($Cl^-$) | | | 12 | 8 | 8 |
| | Bromide ion ($Br^-$) | | | 4 | 10 | 8 |
| Amount of material | | | Eutectic point with water | | | |
| | Chloride salt (A) | Calcium chloride | −51.5 | Number of moles relative to 100 mol of water | | |
| | | | | 6 | 4 | 4 |
| | Bromide salt (B) | Calcium bromide | — | | 2 | 5 | 4 |
| | Inorganic salt (C) | Sodium chloride | −20.9 | | — | — | — |
| | Inorganic salt (E) | Magnesium chloride | −32.1 | | — | — | — |
| | Molar ratio (bromide salt (B)/chloride salt (A)) | | | 0.3 | 1.3 | 1.0 |
| Evaluation results | Rate of temperature increase/decrease 0.5° C./min | Melting temperature | ° C. | −64.0 | −65.7 | −65.0 |
| | | Fixed-temperature maintainability | — | G | G | G |
| | | Duration | min | 14 | 18 | 18 |
| | Melting behavior repeating probability | | % | 100 | 100 | 100 |
| | Melting temperature of not more than −30° C. | | | G | G | G |
| | Melting temperature of not more than −55° C. | | | G | G | G |
| | Melting temperature of not more than −60° C. | | | G | G | G |
| | Duration | | | G | E | E |
| | Volume expansion | | | G | G | G |
| | Ease of handling | | | G | G | G |
| | Practicality evaluation | | | E | E | E |

The evaluation results of Examples 13 to 20 are shown in Table 2. All of the cold storage material compositions prepared in Examples 13 to 20 include water, the chloride salt (A), and the bromide salt (B).

In Examples 13 to 20, it was shown that each of the cold storage material compositions was a three-component eutectic. Specifically, the evaluation results are as below. The cold storage material compositions in Examples 13 to 20 satisfy the condition (1) since the melting temperatures are 1° C. or more lower than the melting temperature derived from an eutectic point of calcium chloride and the melting temperature of calcium bromide. In regard to the cold storage material compositions in Example 14 and Example 20, the melting temperature does not decrease 1.0° C. or more with a 1.5 mol (0.5 mol or more) change in molar quantity of the chloride salt (A). In regard to the cold storage material compositions in Example 19 and Example 20, the melting temperature does not decrease 1.0° C. or more with a 1 mol (0.5 mol or more) change in molar quantity of the bromide salt (B). Thus, the cold storage material compositions in Examples 13 to 20 satisfy the condition (2) as well.

Further, in regard to the cold storage material compositions in Examples 13 to 20, the melting temperature was equal to or lower than −60° C., and all of the evaluation results were "E (Excellent)" or "G (Good)" in "Fixed-temperature maintainability" "Duration", "Melting behavior repeating probability", and "Ease of handling", which showed excellent practicality or good practicality.

TABLE 3

| | | | Com. Ex. 1 | Com. Ex. 2 | Com. Ex. 3 | Com. Ex. 4 | Com. Ex. 5 |
|---|---|---|---|---|---|---|---|
| Three-component | Condition (1) | Lower melting temperature than melting temperatures of two-component systems | — | — | P | P | P |

TABLE 3-continued

| | | | | | | | | | |
|---|---|---|---|---|---|---|---|---|---|
| eutectic evaluation | Condition (2) | Unchanged melting temperature with change in concentration ratio and/or molar quantity | | | — | — | G | G | G |
| | Evaluation | Three-component eutectic | | | — | — | P | P | P |
| Ion concentration | Calcium ion (Ca$^{2+}$) | | | Number of moles relative to 100 mol of water | 6 | 0 | 6 | 4 | 4 |
| | Chloride ion (Cl$^-$) | | | | 12 | 0 | 14 | 12 | 12 |
| | Bromide ion (Br$^-$) | | | | 0 | 6.1 | 0 | 0 | 0 |
| Amount of material | | | Eutectic point with water | | | | | | |
| | Chloride salt (A) | Calcium chloride | −51.5 | Number of moles relative to 100 mol of water | 6 | — | 6 | 4 | 4 |
| | Bromide salt (B) | Ammonium bromide | −16.0 | | — | 6.1 | — | — | — |
| | | Potassium bromide | −12.4 | | — | — | — | — | — |
| | | Sodium bromide | −27.0 | | — | — | — | — | — |
| | Inorganic salt (C) | Sodium chloride | −20.9 | | — | — | 2 | 4 | — |
| | | Ammonium chloride | −15.1 | | — | — | — | — | 4 |
| | Organic substance (D) | Ethanol | — | | — | — | — | — | — |
| | Inorganic salt (E) | Magnesium chloride | −32.1 | | — | — | — | — | — |
| | Molar ratio (bromide salt (B)/chloride salt (A)) | | | | — | — | — | — | — |
| Evaluation results | Rate of temperature increase/ decrease 0.5° C./min | Melting temperature | | ° C. | −51.5 | −16.0 | −50.7 | −50.5 | −52.1 |
| | | Fixed-temperature maintainability | | — | Present | Present | Present | Present | Present |
| | | Duration | | min | 22 | 28 | 25 | 18 | 15 |
| | Melting temperature of not more than −30° C. | | | | G | P | G | G | G |
| | Melting temperature of not more than −55° C. | | | | P | P | P | P | P |
| | Melting temperature of not more than −60° C. | | | | P | P | P | P | P |
| | Duration | | | | E | E | E | E | G |
| | Volume expansion | | | | P | — | — | — | — |
| | Repeatability | | | | P | — | — | — | — |
| | Ease of handling | | | | G | G | G | G | G |
| | Practicality evaluation | | | | P | P | P | P | P |

| | | | | | Com. Ex. 6 | Com. Ex. 7 | Com. Ex. 8 |
|---|---|---|---|---|---|---|---|
| Three-component eutectic evaluation | Condition (1) | Lower melting temperature than melting temperatures of two-component systems | | | P | P | G |
| | Condition (2) | Unchanged melting temperature with change in concentration ratio and/or molar quantity | | | G | P | P |
| | Evaluation | Three-component eutectic | | | P | P | P |
| Ion concentration | Calcium ion (Ca$^{2+}$) | | | Number of moles relative to 100 mol of water | 2 | 6 | 6 |
| | Chloride ion (Cl$^-$) | | | | 9 | 12 | 12 |
| | Bromide ion (Br$^-$) | | | | 0 | 0 | 0 |
| Amount of material | | | Eutectic point with water | | | | |
| | Chloride salt (A) | Calcium chloride | −51.5 | Number of moles relative to 100 mol of water | 2 | 6 | 6 |
| | Bromide salt (B) | Ammonium bromide | −16.0 | | — | — | — |
| | | Potassium bromide | −12.4 | | — | — | — |
| | | Sodium bromide | −27.0 | | — | — | — |
| | Inorganic salt (C) | Sodium chloride | −20.9 | | — | — | — |
| | | Ammonium chloride | −15.1 | | 5 | — | — |
| | Organic substance (D) | Ethanol | — | | — | 0.6 | 1.1 |
| | Inorganic salt (E) | Magnesium chloride | −32.1 | | — | — | — |
| | Molar ratio (bromide salt (B)/chloride salt (A)) | | | | — | — | — |
| Evaluation results | Rate of temperature increase/ decrease 0.5° C./min | Melting temperature | | ° C. | −52.1 | −52.0 | −53.2 |
| | | Fixed-temperature maintainability | | — | Present | Absent | Absent |
| | | Duration | | min | 11 | 0 | 0 |
| | Melting temperature of not more than −30° C. | | | | G | G | G |
| | Melting temperature of not more than −55° C. | | | | P | P | P |

TABLE 3-continued

|  |  |  |  |  |  |
| --- | --- | --- | --- | --- | --- |
| Melting temperature of not more than −60° C. |  |  | P | P | P |
| Duration |  |  | G | P | P |
| Volume expansion |  |  | — | — | — |
| Repeatability |  |  | — | — | — |
| Ease of handling |  |  | G | G | G |
| Practicality evaluation |  |  | P | P | P |

|  |  |  |  |  | Com. Ex. 9 | Com. Ex. 10 | Com. Ex. 11 | Com. Ex. 12 |
| --- | --- | --- | --- | --- | --- | --- | --- | --- |
| Three-component eutectic evaluation | Condition (1) | Lower melting temperature than melting temperatures of two-component systems |  |  | — | — | — | P |
|  | Condition (2) | Unchanged melting temperature with change in concentration ratio and/or molar guantity |  |  | — | — | — | G |
|  | Evaluation | Three-component eutectic |  |  | — | — | — | P |
| Ion concentration | Calcium ion ($Ca^{2+}$) |  | Number of moles relative to 100 mol of water |  | 0 | 0 | 0 | 4 |
|  | Chloride ion ($Cl^-$) |  |  |  | 7.5 | 12 | 6.6 | 16 |
|  | Bromide ion ($Br^-$) |  |  |  | 0 | 0 | 0 | 0 |
| Amount of material |  |  | Eutectic point with water |  |  |  |  |  |
|  | Chloride salt (A) | Calcium chloride | −51.5 | Number of moles relative to 100 mol of water | — | — | — | 4 |
|  | Bromide salt (B) | Ammonium bromide | −16.0 |  | — | — | — | — |
|  |  | Potassium bromide | −12.4 |  | — | — | — | — |
|  |  | Sodium bromide | −27.0 |  | — | — | — | — |
|  | Inorganic salt (C) | Sodium chloride | −20.9 |  | 7.5 | — | — | — |
|  |  | Ammonium chloride | −15.1 |  | — | 12 | — | — |
|  | Organic substance (D) | Ethanol | — |  | — | — | — | — |
|  | Inorganic salt (E) | Magnesium chloride | −32.1 |  | — | — | 3.3 | 4 |
|  | Molar ratio (bromide salt (B)/chloride salt (A)) |  |  |  | — | — | — | — |
| Evaluation results | Rate of temperature increase/decrease 0.5° C./min | Melting temperature | ° C. |  | −20.9 | −15.1 | −32.1 | −51.3 |
|  |  | Fixed-temperature maintainability | — |  | Present | Present | Present | Present |
|  |  | Duration | min |  | 31 | 34 | 18 | 18 |
|  | Melting temperature of not more than −30° C. |  |  |  | P | P | G | G |
|  | Melting temperature of not more than −55° C. |  |  |  | P | P | P | P |
|  | Melting temperature of not more than −60° C. |  |  |  | P | P | P | P |
|  | Duration |  |  |  | E | E | E | E |
|  | Volume expansion |  |  |  | — | — | — | — |
|  | Repeatability |  |  |  | — | — | — | — |
|  | Ease of handling |  |  |  | G | G | G | G |
|  | Practicality evaluation |  |  |  | P | P | P | P |

|  |  |  |  |  | Com. Ex. 13 | Com. Ex. 14 | Com. Ex. 15 |
| --- | --- | --- | --- | --- | --- | --- | --- |
| Three-component eutectic evaluation | Condition (1) | Lower melting temperature than melting temperatures of two-component systems |  |  | P | — | — |
|  | Condition (2) | Unchanged melting temperature with change in concentration ratio and/or molar guantity |  |  | G | — | — |
|  | Evaluation | Three-component eutectic |  |  | P | — | — |
| Ion concentration | Calcium ion ($Ca^{2+}$) |  | Number of moles relative to 100 mol of water |  | 1 | 0 | 0 |
|  | Chloride ion ($Cl^-$) |  |  |  | 9.2 | 0 | 0 |
|  | Bromide ion ($Br^-$) |  |  |  | 0 | 5 | 7.5 |
| Amount of material |  |  | Eutectic point with water |  |  |  |  |
|  | Chloride salt (A) | Calcium chloride | −51.5 | Number of moles relative to 100 mol of water | 1 | — | — |
|  | Bromide salt (B) | Ammonium bromide | −16.0 |  | — | — | — |
|  |  | Potassium bromide | −12.4 |  | — | 5 | — |
|  |  | Sodium bromide | −27.0 |  | — | — | 7.5 |
|  | Inorganic salt (C) | Sodium chloride | −20.9 |  | — | — | — |
|  |  | Ammonium chloride | −15.1 |  | — | — | — |

TABLE 3-continued

|  |  |  |  |  |  |  |  |
|---|---|---|---|---|---|---|---|
|  | Organic substance (D) | Ethanol | — |  | — | — | — |
|  | Inorganic salt (E) | Magnesium chloride | −32.1 |  | 3.6 | — | — |
|  | Molar ratio (bromide salt (B)/chloride salt (A)) |  |  |  | — | — | — |
| Evaluation results | Rate of temperature increase/ decrease 0.5° C./min | Melting temperature | ° C. |  | −51.5 | −12.4 | −27.0 |
|  |  | Fixed-temperature maintainability | — |  | Present | Present | Present |
|  |  | Duration | min |  | 8 | 31 | 22 |
|  | Melting temperature of not more than −30° C. |  |  |  | G | P | P |
|  | Melting temperature of not more than −55° C. |  |  |  | P | P | P |
|  | Melting temperature of not more than −60° C. |  |  |  | P | P | P |
|  | Duration |  |  |  | P | E | E |
|  | Volume expansion |  |  |  | — | — | — |
|  | Repeatability |  |  |  | — | — | — |
|  | Ease of handling |  |  |  | G | G | G |
|  | Practicality evaluation |  |  |  | P | P | P |

The evaluation results of Comparative Examples 1 to 15 are shown in Table 3. Any of the cold storage material compositions in Comparative Examples 1 to 15 was not a three-component eutectic. For example, the following considers Comparative Examples 3 and 4, which are the cold storage material compositions having the components disclosed in Patent Literature 3 listed above. The cold storage material compositions in Comparative Examples 3 and 4 are not the three-component eutectic defined herein. This is because the melting temperatures of the cold storage material compositions in Comparative Examples 3 and 4 are temperatures derived from calcium chloride eutectic, and the decrease in melting temperature defined in the condition (1) is not observed. The cold storage material compositions in Comparative Examples 7 and 8 are not the three-component eutectic defined herein. This is because the melting temperatures of the cold storage material compositions in Comparative Examples 7 and 8 are decreased more than 1.0° C. with a 0.5 mol change in molar quantity of the organic substance (D), which means that the cold storage material compositions in Comparative Examples 7 and 8 do not satisfy the condition (2) defined herein, i.e. the condition that the melting temperature remains unchanged (the amount of change falls within 1.0° C.).

TABLE 4

|  |  |  |  |  | Com. Ex. 16 | Com. Ex. 17 | Com. Ex. 18 | Com. Ex. 19 |
|---|---|---|---|---|---|---|---|---|
| Three-component eutectic evaluation | Condition (1) | Lower melting temperature than melting temperatures of two-component systems |  |  | — | — | — | — |
|  | Condition (2) | Unchanged melting temperature with change in concentration ratio and/or molar quantity |  |  | — | — | — | — |
|  | Evaluation | Three-component eutectic |  |  | — | — | — | — |
| Ion concentration | Calcium ion (Ca$^{2+}$) |  |  | Number of moles relative to 100 mol of water | 6 | 3.9 | 0 | 0 |
|  | Chloride ion (Cl$^-$) |  |  |  | 12 | 0 | 6.6 | 7.5 |
|  | Bromide ion (Br$^-$) |  |  |  | 0 | 7.8 | 0 | 0 |
| Amount of material |  |  | Eutectic point with water |  |  |  |  |  |
|  | Chloride salt (A) | Calcium chloride | −51.5 | Number of moles relative to 100 mol of water | 6 | — | — | — |
|  | Bromide salt (B) | Calcium bromide | — |  | — | 3.9 | — | — |
|  | Inorganic salt (E) | Magnesium chloride | −32.1 |  | — | — | 3.3 | — |
|  | Inorganic salt (C) | Sodium chloride | −20.9 |  | — | — | — | 7.5 |
|  | Molar ratio (bromide salt (B)/chloride salt (A)) |  |  |  | — | — | — | — |
| Evaluation results | Rate of temperature increase/ decrease 0.5° C./min | Melting temperature | ° C. |  | −51.5 | −17.0 | −32.1 | −20.9 |
|  |  | Fixed-temperature maintainability | — |  | G | P | G | G |
|  |  | Duration | min |  | 22 | 0 | 18 | 31 |
|  | Melting behavior repeating probability |  | % |  | — | — | — | — |
|  | Melting temperature of not more than −30° C. |  |  |  | G | P | G | P |
|  | Melting temperature of not more than −55° C. |  |  |  | P | P | P | P |
|  | Melting temperature of not more than −60° C. |  |  |  | P | P | P | P |
|  | Duration |  |  |  | E | P | E | E |
|  | Volume expansion |  |  |  | — | — | — | — |
|  | Ease of handling |  |  |  | G | G | G | G |
|  | Practicality evaluation |  |  |  | P | P | P | P |

TABLE 4-continued

|  |  |  |  |  | Com. Ex. 20 | Com. Ex. 21 | Com. Ex. 22 | Com. Ex. 23 |
|---|---|---|---|---|---|---|---|---|
| Three-component eutectic evaluation | Condition (1) | Lower melting temperature than melting temperatures of two-component systems | | | P | P | P | P |
| | Condition (2) | Unchanged melting temperature with change in concentration ratio and/or molar guantity | | | G | G | G | G |
| | Evaluation | Three-component eutectic | | | P | P | P | P |
| Ion concentration | Calcium ion ($Ca^{2+}$) | | | Number of moles relative to 100 mol of water | 4 | 1 | 6 | 4 |
| | Chloride ion ($Cl^-$) | | | | 16 | 9.2 | 14 | 12 |
| | Bromide ion ($Br^-$) | | | | 0 | 0 | 0 | 0 |
| Amount of material | | | Eutectic point with water | | | | | |
| | Chloride salt (A) | Calcium chloride | −51.5 | Number of moles relative to 100 mol of water | 4 | 1 | 6 | 4 |
| | Bromide salt (B) | Calcium bromide | — | | — | — | — | — |
| | Inorganic salt (E) | Magnesium chloride | −32.1 | | 4 | 3.6 | — | — |
| | Inorganic salt (C) | Sodium chloride | −20.9 | | — | — | 2 | 4 |
| | Molar ratio (bromide salt (B)/chloride salt (A)) | | | | — | — | — | — |
| Evaluation results | Rate of temperature increase/decrease 0.5° C./min | | Melting temperature | ° C. | −51.3 | −51.5 | −50.7 | −50.5 |
| | | | Fixed-temperature maintainability | — | G | G | G | G |
| | | | Duration | min | 18 | 8 | 25 | 18 |
| | Melting behavior repeating probability | | | % | — | — | — | — |
| | Melting temperature of not more than −30° C. | | | | G | G | G | G |
| | Melting temperature of not more than −55° C. | | | | P | P | P | P |
| | Melting temperature of not more than −60° C. | | | | P | P | P | P |
| | Duration | | | | E | G | E | E |
| | Volume expansion | | | | — | — | — | — |
| | Ease of handling | | | | G | G | G | G |
| | Practicality evaluation | | | | P | P | P | P |

The evaluation results of Comparative Examples 16 to 23 are shown in Table 4. Any of the cold storage material compositions in Comparative Examples 16 to 23 was not a three-component eutectic. Specifically, the cold storage material compositions in Comparative Examples 20 to 23 are not the three-component eutectic defined herein. This is because the melting temperatures of the cold storage material compositions in Comparative Examples 20 to 23 are temperatures derived from calcium chloride eutectic, and the decrease in melting temperature defined in the condition (1) is not observed.

Further, the cold storage material compositions in Comparative Examples 16 to 19 are cold storage material compositions which contain water and a single inorganic salt. When the cold storage material compositions in Comparative Examples 16 to 19 are solidified at −80° C., the melting temperatures do not become equal to or lower than −60° C.

Further, the cold storage material compositions in Comparative Examples 20 and 21 are the cold storage material compositions having the components disclosed in Patent Literature 2 listed above. When the cold storage material compositions in Comparative Examples 20 and 21 are solidified at −80° C., the melting temperatures do not become not more than −60° C. Moreover, the cold storage material compositions in Comparative Examples 22 and 23 are the cold storage material compositions having the components disclosed in Patent Literature 3 listed above. When the cold storage material compositions in Comparative Examples 22 and 23 are solidified at −80° C., the melting temperatures do not become not more than −60° C.

<Performance Test of Transport Container>

The transport container illustrated in FIGS. 2 and 3 was produced with the use of cold storage materials each filled with a cold storage material composition. Specifically, the transport container was produced as below. As a box of the thermal insulation container 40, a thermal insulation container with vacuum thermal insulation materials placed inside in six orientations (a product available from SUGI-YAMA-GEN CO., LTD.; external dimensions: 480 mm in width×455 mm in length×535 mm in height; and thickness of thermal insulation material: 50 mm) was used. As the cold storage material composition 20 with which the cold storage material 10 is filled, the cold storage material composition in Example 1 shown in Table 1 was used.

First, 10 cold storage materials 10 were left to stand still in a deep freezer at a temperature of −80° C. for 72 hours so that the cold storage materials 10 were in the solidified state. Then, the 10 cold storage materials 10 were placed (in other words, packed) in the box 41 of the thermal insulation container 40 with the use of the spacers 6, so as to surround the space 5 which would accommodate a temperature control target article. Specifically, there were placed the 10 cold storage materials 10 in total including 2 cold storage materials 10 along the bottom surface 411 of the box, 2 cold storage materials 10 along each surface of a pair of opposite surfaces of the lateral surfaces 412 of the box, and 4 cold storage materials 10 above the opening 410 (see (a) and (b) of FIG. 2). Here, the size (trunk size) of the space 5 provided inside the box 41, which accommodated the 10 cold storage materials, and intended to accommodate a temperature control target article was 180 mm in width×220 mm in length× 70 mm in height, and the volume (internal volume) of the space 5 was approximately 2.8 L.

A thermocouple was placed at the center part of the box of the produced thermal insulation container 40 (specifically, at the center part of the space 5). Then, the lid was closed, so that the transport container 1 was completed. The transport container 1 thus obtained was placed in a thermostatic bath set at a temperature of 25° C. Subsequently, a shift in temperature of the center part (specifically, the center part of the space 5) was measured with the use of the thermocouple at intervals of 1 minute. FIG. 4 shows results of the measurement.

FIG. 4 illustrates how the temperature in the transport container 1 changed over time in a case where the above-described transport container 1 was left in an environment at a temperature of 25° C. Such a change in temperature over time of the transport container 1 is a change during a process in which the cold storage material composition 20 (cold storage material composition in accordance with Example 1) was melting from the solid state into the liquid state in a case where the cold storage materials 10 filled with the cold storage material composition 20 were placed in the transport container 1. In FIG. 4, a period of time for which a temperature range of not more than −60° C. was held was 24 hours.

Further, as the temperature control target article was used a sample which is a cryovial filled with a suspension of human bone marrow-derived mesenchymal stem cells (available from Lonza). After the sample was frozen in liquid nitrogen gas phase, the sample was removed from the liquid nitrogen gas phase and then placed in the space 5 in the transport container 1, so that the sample was packed. After the transport container 1 was stored in a clean room for 24 hours, the sample was unpacked from the transport container 1 and was then subjected to cell culture operation. The amount of increase of the human bone marrow-derived mesenchymal stem cells after one week of the culture was substantially the same as the amount of increase of human bone marrow-derived mesenchymal stem cells which were frozen in liquid nitrogen gas phase and was then subjected to cell culture operation without having been stored in the transport container 1.

INDUSTRIAL APPLICABILITY

A cold storage material composition in accordance with an embodiment of the present invention, a cold storage material including the cold storage material composition, and a transport container each allow a temperature control target article whose controlled temperature is in a range of −75° C. to −30° C. to be stored or transported at its controlled temperature under a specific environment. Further, a method of using a cold storage material composition in accordance with an embodiment of the present invention, allows a temperature control target article whose controlled temperature is in a range of −75° C. to −55° C. to be stored or transported at its controlled temperature under a specific environment. Thus, an embodiment of the present invention is suitably applicable to storage and transport of articles such as cells, pharmaceutical products, regenerative cells, specimens, food, and the like.

The invention claimed is:

1. A cold storage material composition, comprising a multicomponent eutectic which is composed of water and two or more kinds of compounds,
the cold storage material composition having a melting temperature in a range of −75° C. to −30° C., and
the two or more kinds of compounds are inorganic salts,
wherein the inorganic salts include a chloride salt (A) and a bromide salt (B),
wherein the bromide salt (B) is at least one selected from a group consisting of ammonium bromide, potassium bromide, and calcium bromide;
wherein the cold storage material composition has a melting temperature that is lower than all eutectic point derived melting temperatures exhibited by all two-component systems comprised of water and the individual inorganic salts (A) and (B); and
wherein each of the compounds (A) and (B) in the cold storage material composition are present in molar quantities such that the melting temperature of the cold storage material composition falls within +/−1° C. with a 0.5 mol change in molar quantity (mol relative to 100 mol of water) of at least one of the compounds in the cold storage material.

2. The cold storage material composition as set forth in claim 1, wherein the multicomponent eutectic is a three-component eutectic.

3. The cold storage material composition as set forth in claim 1, wherein the inorganic salts include a calcium salt.

4. The cold storage material composition as set forth in claim 1, wherein the chloride salt (A) is calcium chloride.

5. The cold storage material composition as set forth in claim 1, wherein a molar ratio between the chloride salt (A) and the bromide salt (B) (bromide salt (B)/chloride salt (A)) is in a range of 0.1 to 10.

6. The cold storage material composition as set forth in claim 1, wherein the melting temperature is in a range of −75° C. to −60° C.

7. A cold storage material composition, comprising 0.1 mol to 18 mol of calcium ions, 0.1 mol to 19 mol of chloride ions, and 0.1 mol to 20 mol of bromide ions, relative to 100 mol of water,
the cold storage material composition having a melting temperature in a range of −75° C. to −30° C., and
a molar ratio of calcium ions to chloride ions (molar quantity of calcium ions:molar quantity of chloride ions) contained in the cold storage material composition is in the range from 1:0.1 to 1:1.69.

8. A method of using a cold storage material composition, comprising:
a solidifying step of keeping a cold storage material composition at a temperature lower than a melting temperature of the cold storage material composition to solidify the cold storage material composition, the cold storage material composition comprising a multicomponent eutectic which is composed of water and two or more kinds of compounds;
a maintaining step of maintaining part or whole of a target object at not less than −75° C. to not more than −30° C. under an environment with a temperature which exceeds the melting temperature of the cold storage material composition, and
wherein the two or more kinds of compounds of the cold storage material composition are inorganic salts, wherein the inorganic salts include a chloride salt (A) and a bromide salt (B), wherein the bromide salt (B) is at least one selected from a group consisting of ammonium bromide, potassium bromide, and calcium bromide;
wherein the cold storage material composition has a melting temperature that is lower than all eutectic point derived melting temperatures exhibited by all two-component systems comprised of water and the individual inorganic salts (A) and (B); and
wherein each of the compounds (A) and (B) in the cold storage material composition are present in molar quantities such that the melting temperature of the cold storage material composition falls within +/−1° C. with a 0.5 mol change in molar quantity (mol relative to 100 mol of water) of at least one of the compounds in the cold storage material.

9. The method as set forth in claim 8, wherein the solidifying step includes keeping the cold storage material composition at a temperature equal to or lower than −80° C. to solidify the cold storage material composition.

* * * * *